United States Patent

Hamamoto et al.

[11] Patent Number: 5,953,486
[45] Date of Patent: Sep. 14, 1999

[54] RECORDING AND REPRODUCING APPARATUS

[75] Inventors: Yasuo Hamamoto, Higashiosaka; Kenji Morimoto, Osaka; Akihiro Takeuchi, Ikoma; Mutsuyuki Okayama, Kobe; Katsufumi Kohno, Sakai; Masazumi Yamada, Moriguchi; Tadashi Kunihira, Osaka, all of Japan

[73] Assignee: Matsushita Electric Industrial Co., Ltd., Osaka-fu, Japan

[21] Appl. No.: 08/963,511

[22] Filed: Nov. 3, 1997

Related U.S. Application Data

[63] Continuation of application No. 08/404,166, Mar. 14, 1995, abandoned.

[30] Foreign Application Priority Data

Mar. 14, 1994 [JP] Japan ..................................... 6-042538
May 31, 1994 [JP] Japan ..................................... 6-118200

[51] Int. Cl.[6] .................................................. H04N 5/783
[52] U.S. Cl. ................................. 386/68; 386/80; 386/81
[58] Field of Search ................................. 386/46, 68, 80, 386/81, 111, 112, 124, 74; 360/32, 48; H04N 5/783

[56] References Cited

U.S. PATENT DOCUMENTS 5,136,391 8/1992 Minami ................................. 358/312
5,282,049 1/1994 Hatakenaka et al. .................. 358/335
5,510,899 4/1996 Kim ...................................... 358/335
5,576,902 11/1996 Lane et al. ............................. 386/68
5,778,138 7/1998 Ishimoto et al. ...................... 386/68

FOREIGN PATENT DOCUMENTS 0606856 7/1994 European Pat. Off. .
4-337989 11/1992 Japan .

OTHER PUBLICATIONS

European Search Report dated Oct. 5, 1995.

Primary Examiner—Huy Nguyen
Attorney, Agent, or Firm—Ratner & Prestia

[57] ABSTRACT

A recording apparatus for recording digital signals to plural tracks formed sequentially on a tape using plural heads includes a first selector for selecting the first through n track sets, continuous tracks within the plural tracks formed on the tape. A disposer disposes the first through k separated high speed reproduction data areas to the same positions in each of the m tracks comprising the first through n track sets. A first recording unit records the same high speed reproduction data to the same track position in at least the tracks having the same azimuth within the m*k high speed reproduction data areas belonging to the same track set. A second selector selects the n+1 through n+N, each track set comprising M tracks selected from among the tracks to which the high speed reproduction data areas are not disposed. A second disposer disposes a continuous very-high speed reproduction data area to the same position in each of the M tracks forming the n+1 through n+N track sets. A second recorder record the same very-high speed reproduction data to the M very-high speed reproduction data areas belonging to the same track set within the M*N very-high speed reproduction data areas belonging to the n+1 to n+N track sets.

13 Claims, 29 Drawing Sheets

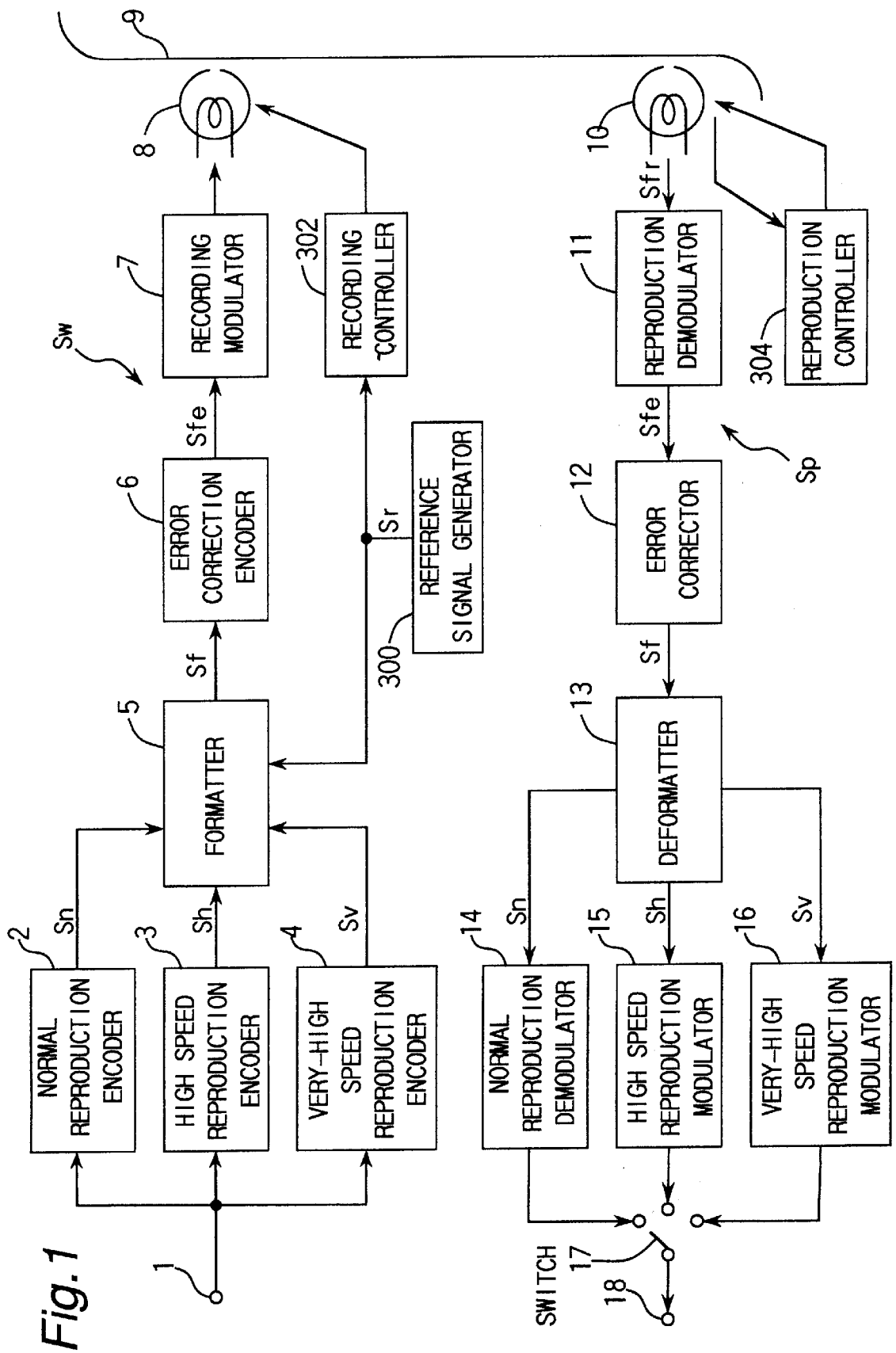

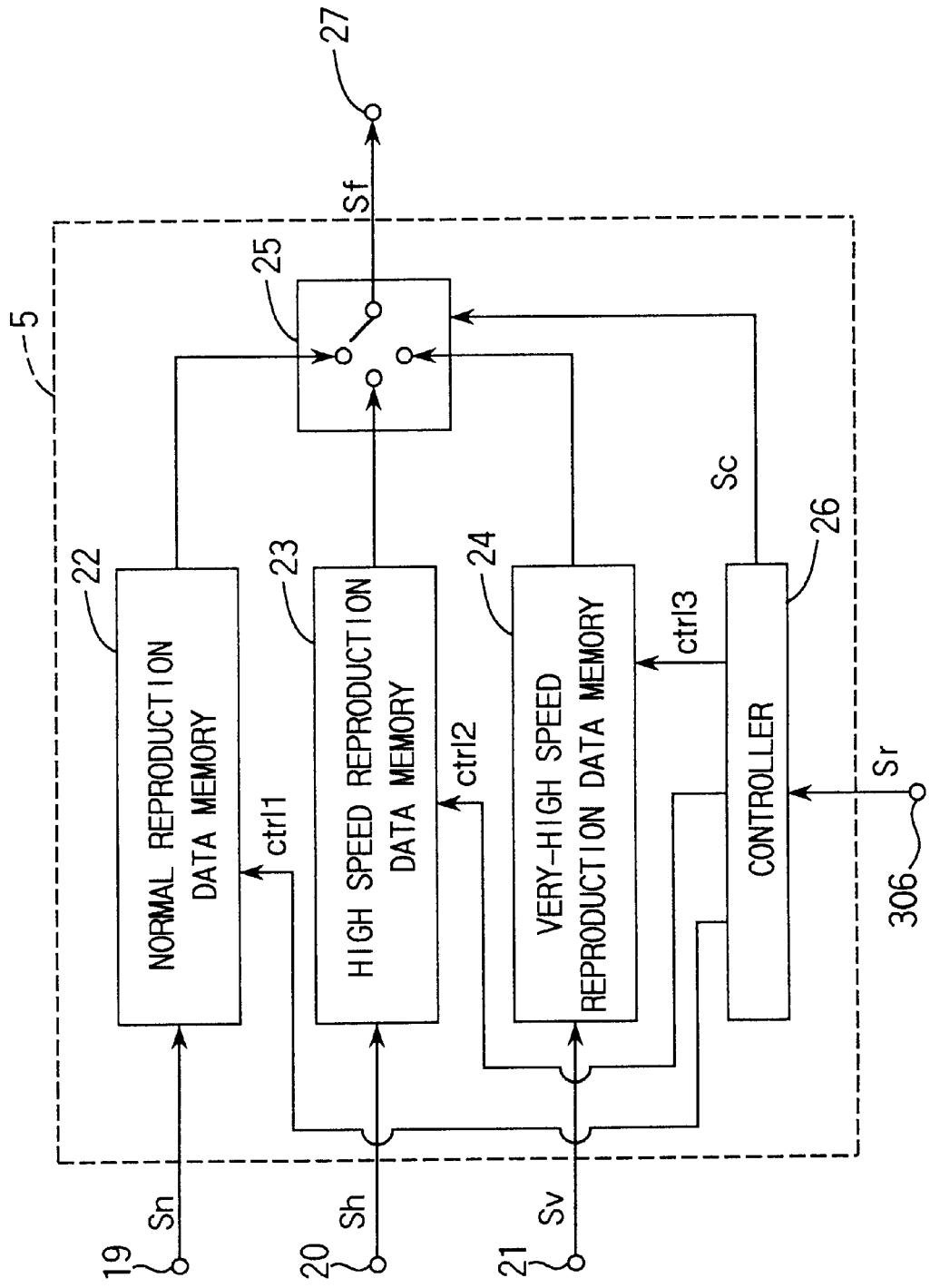

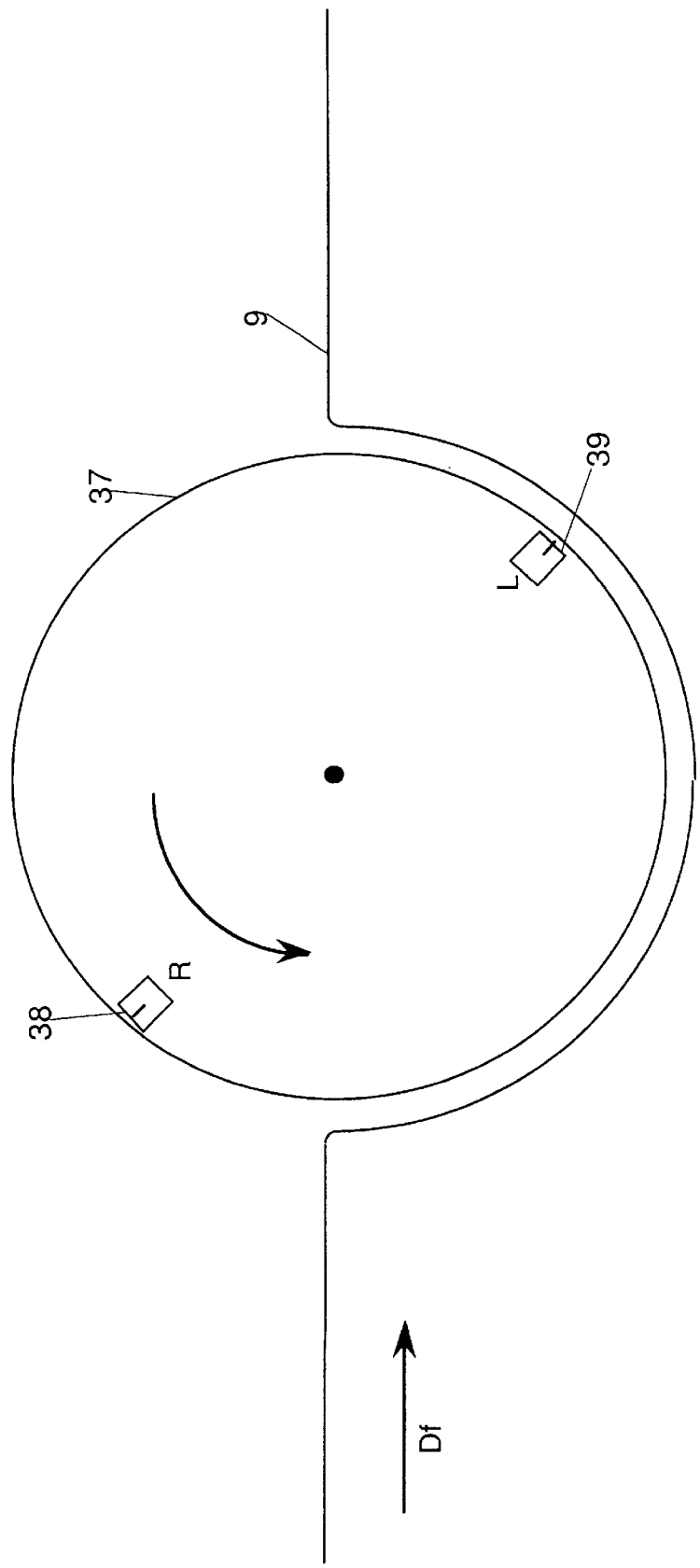

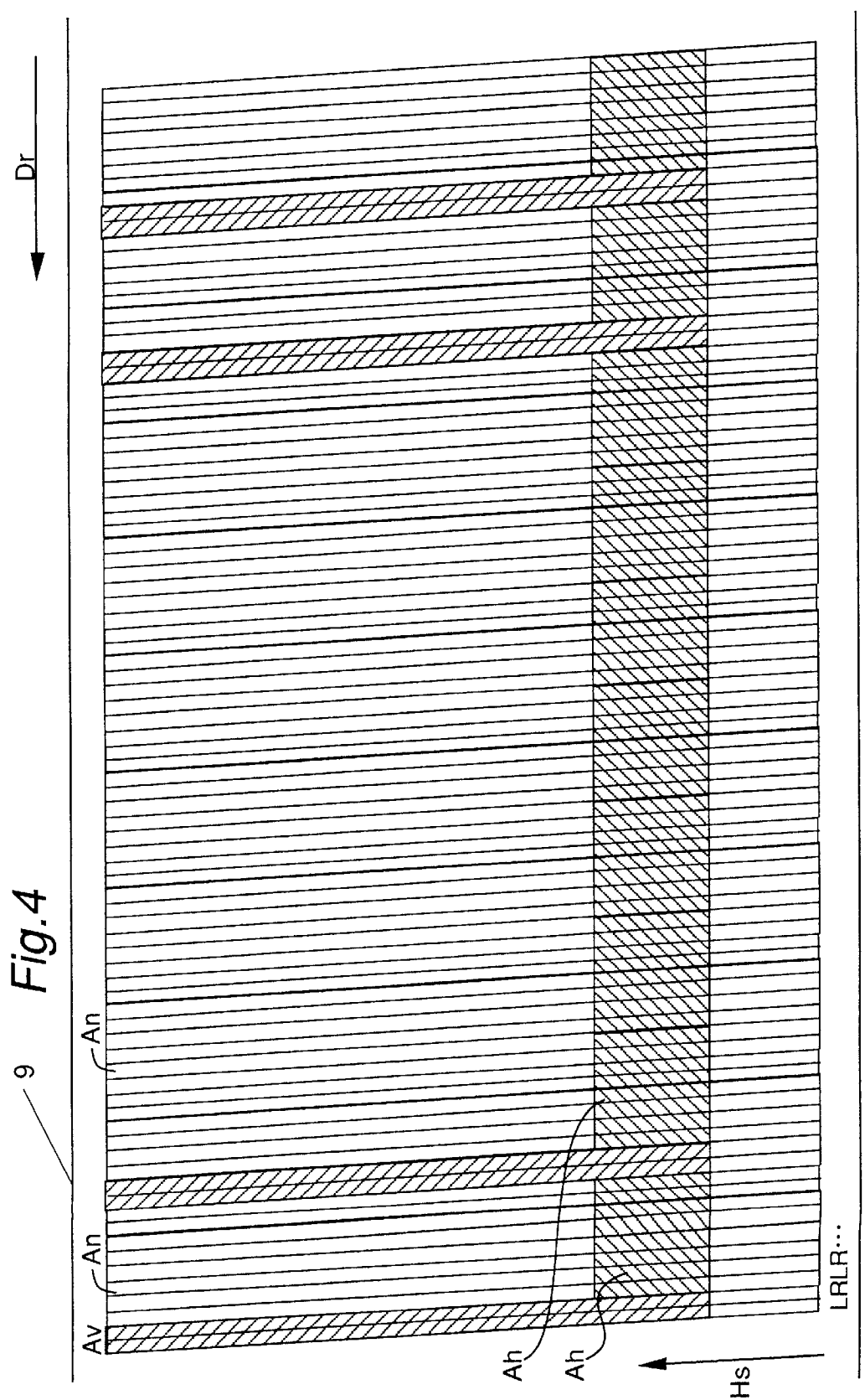

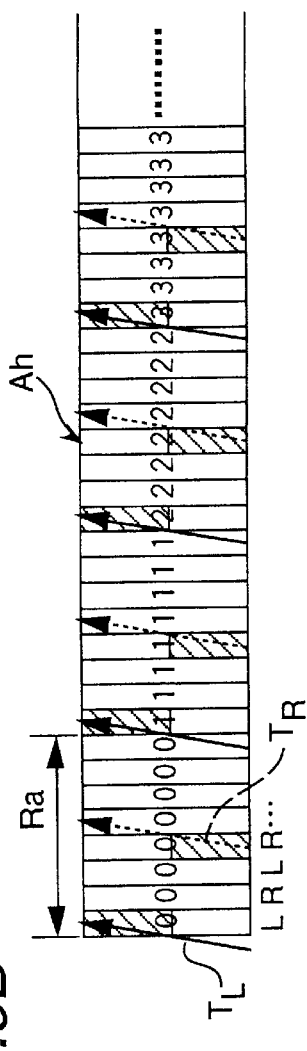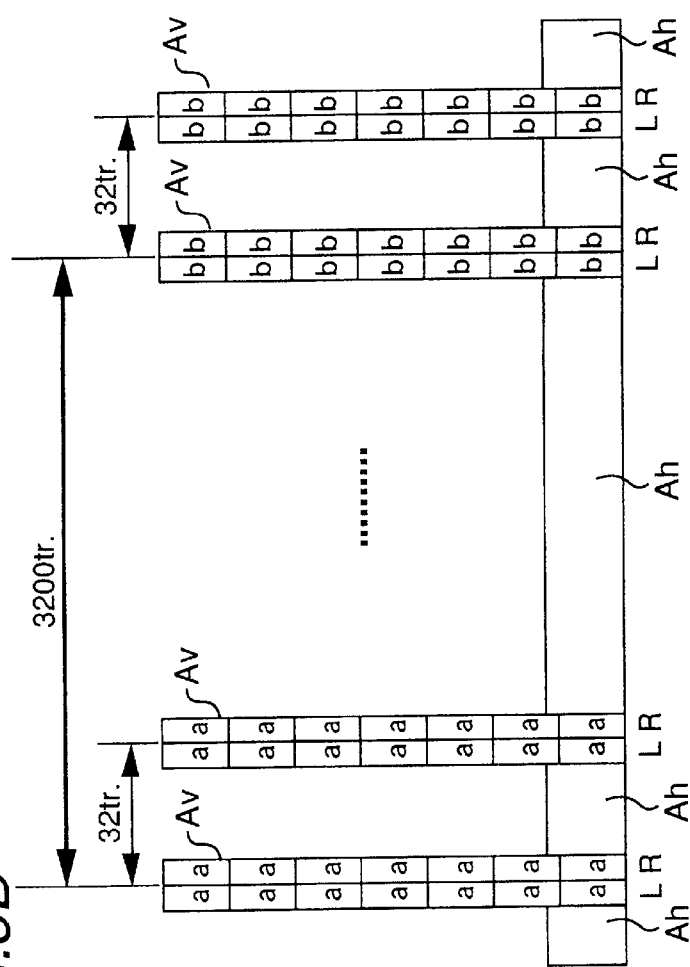
Fig.5A  Fig.5B  Fig.5C  Fig.5D

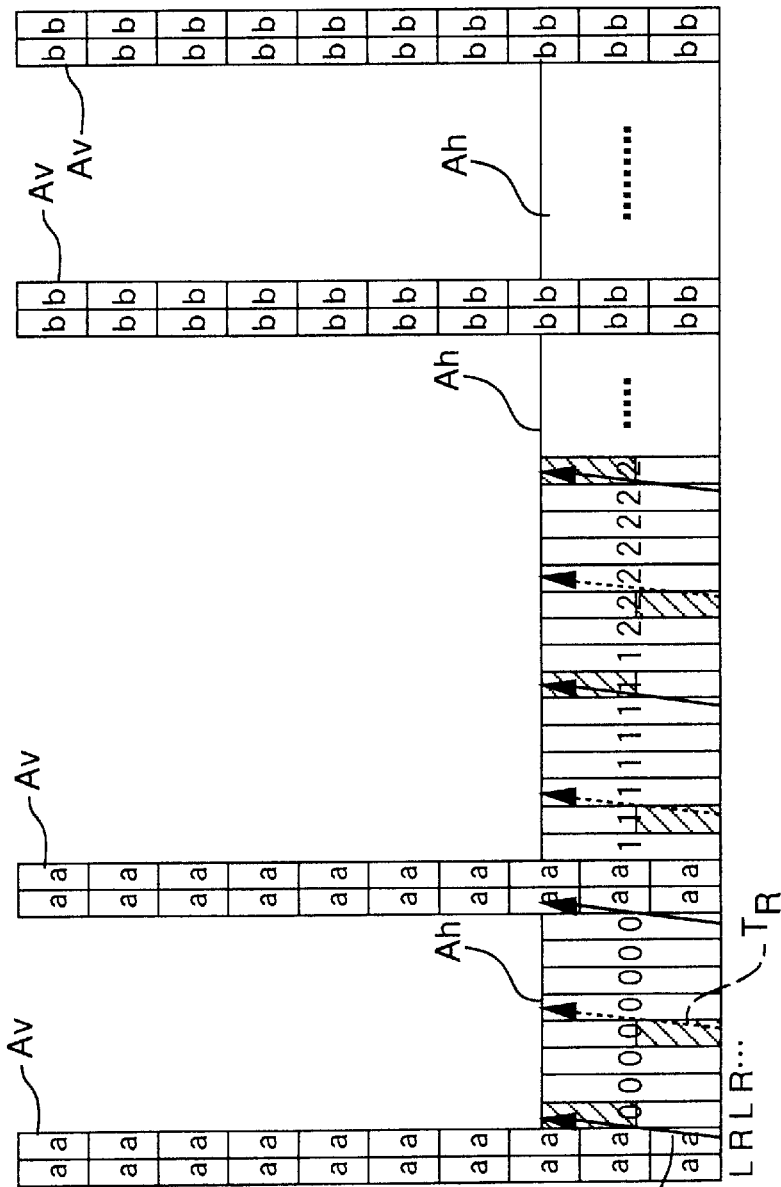

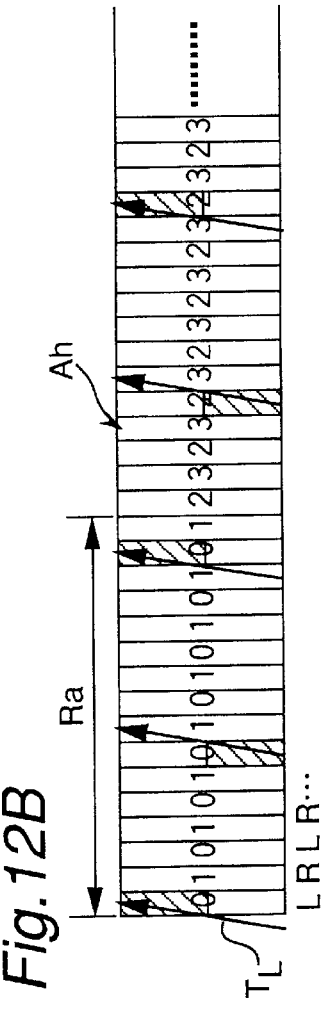
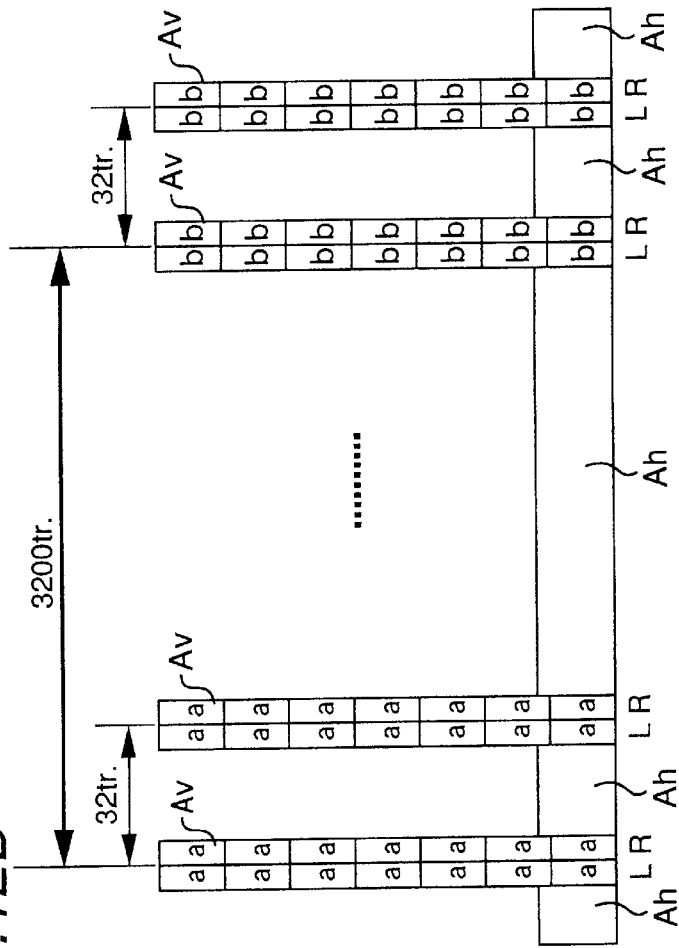
Fig. 12A
Fig. 12B
Fig. 12C
Fig. 12D

Fig.13A

| Segment 0 |
| Segment 1 |
| Segment 2 |
| Segment 3 |

Fig.13B

| Segment a |
| Segment b |
| Segment c |
| Segment d |
| Segment e |

Fig.13C

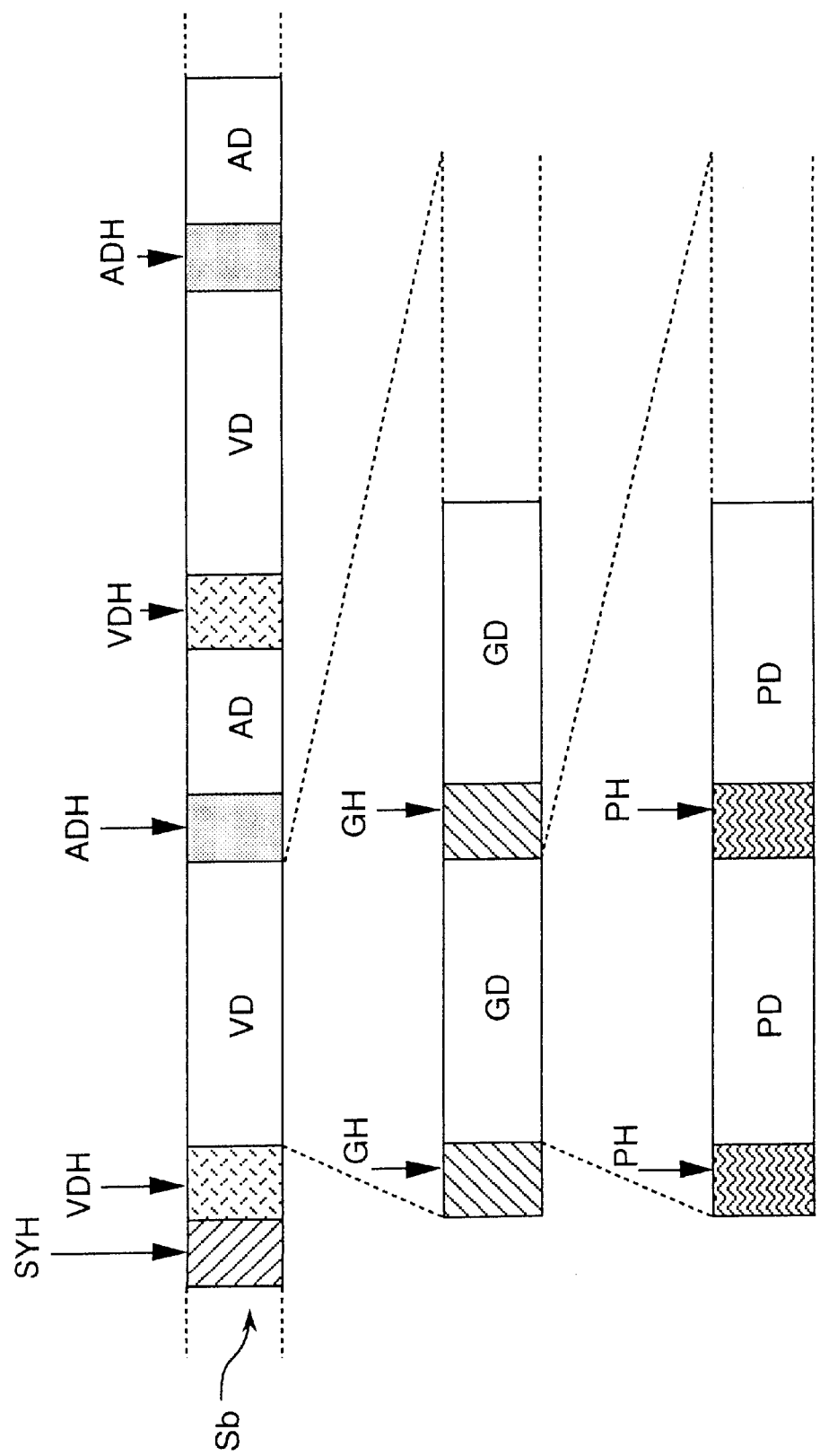

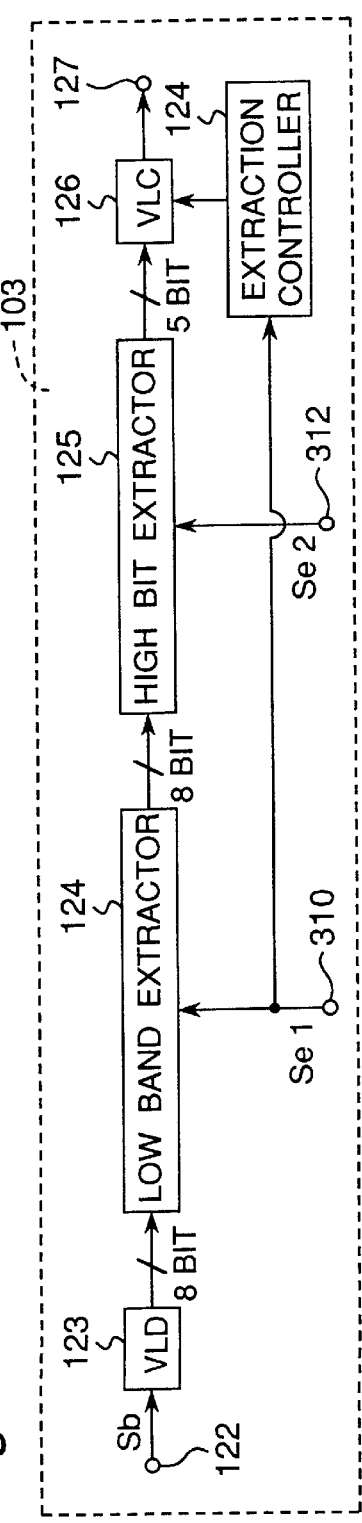

RECORDING AND REPRODUCING APPARATUS

This application is a continuation of application Ser. No. 08/404,166 filed Mar. 14, 1995 now abandoned.

BACKGROUND OF THE INVENTION

1. Field of the Invention

The present invention relates to a recording and reproducing apparatus for recording and reproducing video signals and/or other types of signals. This apparatus is especially suitable for the recording and reproducing digital signals to a strip-shaped recording medium using a helical scan-type rotating head.

2. Description of the Prior Art

When using a recording and reproducing apparatus for recording and reproducing digital signals to a magnetic tape or other strip-shaped recording medium using a helical scan-type rotating head, the head path during high speed reproduction generally differs from the head path during normal reproduction (in which the reproduction head speed equals the recording head speed), and it is therefore extremely difficult during high speed reproduction to reproduce with good image quality data that was recorded for reproduction at the normal reproduction speed.

To enable high speed reproduction using the unique characteristics of helical scan recording, data for high speed reproduction is recorded in addition to the data for normal reproduction using a recording pattern different from that used for the normal reproduction data. High speed reproduction can thus be achieved using this high speed reproduction data.

It is possible, for example, to achieve high speed reproduction or very-high speed reproduction over a wide range of reproduction speeds by separately recording to the tape high speed reproduction data for use through a range of relatively low reproduction speeds, and very-high speed reproduction data for use through a range of relatively high reproduction speeds.

In FIG. 11, a tape track pattern recorded by the convention recording apparatus is shown. The head scans in a direction Hs to form plural tracks on the tape 9 which is being traveled in direction Dr. A very-high speed reproduction data are recorded in area Av; high speed reproduction data is recorded in area Ah; and normal reproduction data is recorded in area An. Since the high speed reproduction data is recorded to a area crossing each track in a continuous band, and it is therefore not possible to extend a very high speed reproduction data area Av to a maximum beyond the high speed reproduction data area Ah.

With this method, however, it is considered not possible to record the data without degrading the reproduction characteristics (bit rate during reproduction and reproduction speed range) of both the high speed reproduction data and the very-high speed reproduction data.

With a conventional recording and reproducing apparatus thus described, the high speed reproduction data used at relatively low reproduction speeds is recorded to cross bands at a predetermined position in every track, and the area available for very-high speed reproduction data is necessarily reduced by the width of these cross bands. This reduces the speed range for very-high speed reproduction. In addition, the width of the bands to which the high speed reproduction data is recorded cannot increased to reduce the effect on the very-high speed reproduction data. The track location and number of bands used for the high speed reproduction data are also limited to one band near the end of each track. As a result, the amount of data reproduced during high speed reproduction is limited, and the bit rate during reproduction is low.

The data for both high speed reproduction and very-high speed reproduction is also recorded with the same syntax used for the normal reproduction data by the above conventional recording and reproducing apparatus. If the data reproduced during normal reproduction is recorded as an MPEG signal irrespective of the data requirements during high speed reproduction and very-high speed reproduction, the standards defined by the MPEG syntax must be maintained. As a result, the bit stream for each of the reproduction speeds recorded is recorded in the form containing the header information and all other signals defined by the MPEG syntax.

This header information comprises a large part of the data for each of the reproduction speeds. As a result, the header information reduces the amount of data allocated for the video information, this video information determines the image quality during reproduction, and the header information therefore becomes a significant factor degrading image quality during high speed reproduction and increasing the image refresh cycle.

In addition, intra-frame compression data is normally used for the high speed reproduction data. With an MPEG signal, intra-frame compression data contains an extremely large volume of data, including a large quantity of code information, e.g., end-of-block (EOB) codes identifying the end of each data block, that is otherwise unnecessary. This code information thus becomes another factor contributing to degraded image quality or an increased image refresh cycle.

As a result, the real amount of recordable video information is reduced, and image quality is therefore degraded or the image refresh cycle becomes long, because the conventional recording and reproducing apparatus records with the high speed reproduction data and very-high speed reproduction data that is not part of the actual picture data.

SUMMARY OF THE INVENTION

The object of the present invention is therefore to provide an imaging device which solves these problems.

The present invention has been developed with a view to substantially solving the above described disadvantages and has for its essential object to provide an improved recording apparatus for recording signals to plural tracks formed sequentially on a tape-like recording medium using plural recording heads disposed on a rotating drum, said apparatus comprises a first selecting means for selecting the first through n track sets, each track set comprising m continuous tracks within the plural tracks formed on the tape-like recording medium, said n being 1 or greater, said m being 2 or greater; a disposing means for disposing first through k separated high speed reproduction data areas to the same positions in each of the m tracks comprising the first through n track sets, said k being 1 or greater; a first recording means for recording the same high speed reproduction data to the same track position in at least the tracks having the same azimuth within the m*k high speed reproduction data areas belonging to the same track set; a second selecting the n+1 through n+N track sets, each track set comprising M tracks selected from among the tracks to which the high speed reproduction data areas are not disposed, said N being 1 or greater, said M being 2 or greater; a second disposing means for disposing a continuous very-high speed reproduction data area to the same position in each of the M tracks forming the n+1 through n+N track sets; and a second recording the same very-high speed reproduction data to the M very-high speed reproduction data areas belonging to the same track set within the M*N very-high speed reproduction data areas belonging to the n+1 to n+N track sets.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 1 is a block diagram showing a recording and reproducing apparatus according to a preferred embodiment of the present invention;

FIG. 2 is a block diagram showing a formatter in the recording and reproducing apparatus of FIG. 1;

FIG. 3 is a conceptual diagram showing the tape scanning mechanism;

FIG. 4 is a map of tape pattern recorded by the signal recording and reproducing apparatus of FIG. 1;

FIG. 5A is graph showing data segments for the high speed reproduction according to the present invention;

FIG. 5B is a conceptual map of the data arrangement in the high speed reproduction area according to the present invention;

FIG. 5C is graph showing data segments for the very-high speed reproduction area according to the present invention;

FIG. 5D is a conceptual map of the data arrangement in the very-high speed reproduction area according to the present invention;

FIG. 6A is graph showing data segments for the high speed reproduction according to the present invention;

FIG. 6B is graph showing data segments for the very-high speed reproduction area according to the present invention;

FIG. 6C is a conceptual map of the first data arrangement pattern formed by the recording and reproducing apparatus of FIG. 1;

FIG. 12A is graph showing data segments for the high speed reproduction according to the present invention;

FIG. 12B is a conceptual map of the data arrangement in the high speed reproduction area according to the present invention;

FIG. 12C is graph showing data segments for the very-high speed reproduction area according to the present invention;

FIG. 12D is a conceptual map of another data arrangement in the very-high speed reproduction area according to the present invention;

FIG. 13A is graph showing data segments for the high speed reproduction according to the present invention;

FIG. 13B is graph showing data segments for the very-high speed reproduction area according to the present invention;

FIG. 13C is a conceptual map of the second data arrangement pattern formed by the recording and reproducing apparatus according to the present invention;

FIG. 20 is a map of the bit stream input to the recording and reproducing apparatus of FIG. 19;

FIG. 21A is a block diagram showing the high speed reproduction data extractor in the recording and reproducing apparatus of FIG. 19;

FIG. 21B is a graph showing the data after VLD operation;

FIG. 21C is a graph showing the data after low band extraction;

FIG. 21D is a graph showing the data after high bit extraction;

DETAILED DESCRIPTION OF THE PREFERRED EMBODIMENTS

First Embodiment

Figure 7:
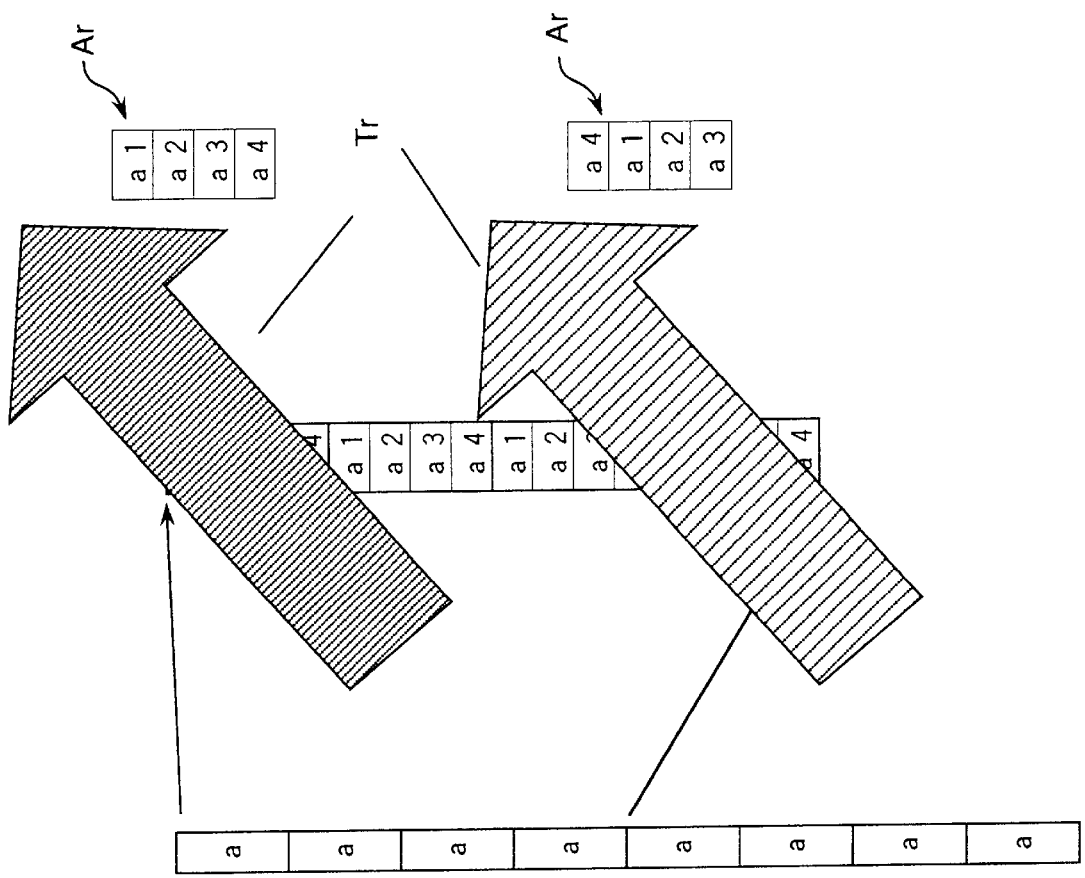
FIG. 7 is a graph in assistance of explaining the principle of very-high speed reproduction according to the present invention.

Referring to FIG. 1, a recording and reproducing apparatus according to the present invention, used for recording and reproducing signals to a tape-like recording medium 9 is shown. The recording and reproducing apparatus includes a recording system Sw for recording signals to and a reproducing system Sp for reproducing recorded signal from the medium 9.

The recording system Sw includes an input terminal 1, a normal reproduction encoder 2, a high speed reproduction encoder 3, a very-high speed reproduction encoder 4, a formatter 5, an error correction encoder 6, a recording modulator 7, a recording head unit 8 having two recording heads (38 and 39 in FIG. 3), a reference signal generator 300, and a recording controller 302 connected to each other, as shown in FIG. 1. The reference signal generator 300 produces a reference signal Sr for controlling the operation of the recording system Sw.

The reference signal Sr is synchronized the rotation of the rotating drum (not shown) wherein the recording head 8 is provided. The reference signal Sr having the same frequency as that of the rotating frequency of the rotating drum. In the video cassette recorder for example, the rotating frequency of the drum is usually set to 30 Hz. This reference signal Sr having 30 Hz frequency is supplied to the recording controller 302 and the formatter 5. Based on the reference signal Sr, the recording controller 302 controls the rotation of drum and feeding speed of the video tape 9 so that the recording head 8 forms tracks on predetermined positions of the tape 9.

The recording signal So such as a video signal input from the input terminal 1 is first input to the normal reproduction encoder 2, the high speed reproduction encoder 3, and the very-high speed reproduction encoder 4, each of which generates the data for reproduction at the corresponding reproduction speed. Based on the original signal So, the normal reproduction encoder 2, the high speed reproduction encoder 3, and very-high speed reproduction encoder 4 produces a normal reproduction data Sn and a high speed reproduction data Sh, and a very-high speed reproduction data Sv, respectively. Those reproduction data Sn, Sh, and Sv are, then, transferred to the formatter 5 which formats each of the data Sn, Sh, and Sv to the sequence required for the recording pattern of the tape to produce a formatted recording data Sf based on the reference signal Sr from the reference signal generator 300.

Referring to FIG. 2, details of the formatter 5 is shown. The formatter 5 has four input terminals 19, 20, 21, and 306; a normal reproduction data memory 22; a high speed reproduction data memory 23; a very-high speed reproduction data memory 24; a recording data switch 25; a controller 26; and an output terminal 27. The input terminals 19, 20, and 21 are connected to the encoders 2, 3, and 4 for receiving the reproduction data Sn, Sh, and Sv therefrom, respectively. The input terminal 306 is connected to the reference signal generator 300 for receiving the reference signal Sr therefrom. Based on the reference signal Sr through the terminal 306, the controller 26 produces and transfers timing signals Ctrl1, Ctrl2, and Ctrl3 to the memories 22, 23, and 24, respectively, at a predetermined timing. The controller 26 further produces and transfers a control signal Sc indicative of currently produced timing signal Ctrl1, Ctrl2, or Ctrl3 to the recording data switch 25.

At each of leading edge of the first timing signal Ctrl1, the normal reproduction data memory 22 outputs the normal reproduction data Sn stored therein to the recording data switch 25. Similarly, the high speed reproduction data memory 23 outputs the high speed reproduction data Sh stored therein at each of leading edge of the second timing signal Ctl2. The very-high speed reproduction data memory 24 outputs very-high speed reproduction data Sv stored therein at each leading edge of the third timing signal Ctrl3. The controller 26 controls the switch 25 to read the data in the sequence required for the corresponding recording pattern, and outputs the data thus formatted from the output terminal 27. Based on the indication of control signal Sc, the recording data switch 25 selectively connects either one of memories 22, 23, and 24 which is currently receiving the timing signal to the output terminal 27 at a predetermined timing so as to output the formatted recording data Sf wherein the data Sn, Sh, and Sv are arranged in the predetermined sequence. The operation of the controller 26 will described later with reference to FIG. 26.

Referring back to FIG. 1, the formatted recording data Sf is transferred to the error correction encoder 6 wherein an error correction code is then added to the formatted data Sf. Then, the error correction code added data Sf is further transferred to the recording modulator 7. The recording modulator 7 applies the 8-14, 8-10, or otherwise appropriately modulation to the formatted data Sf recording. Thus modulated data Sf is recorded to the tape-like recording medium 9 by the recording head 8 using helical scan recording.

The reproducing system Sp includes a reproduction head unit 10 having two recording heads (38 and 39 in FIG. 3), a reproduction demodulator 11, an error corrector 12, a deformatter 13, a normal reproduction demodulator 14, a high speed reproduction demodulator 15, a very-high speed reproduction demodulator 16, a reproduction mode switch 17, an output terminal 18, and a reproduction controller 304 connected to each other, as shown in FIG. 1. The reproduction controller 302 controls the rotation of drum and feeding speed of the video tape 9 so that the reproducing head 10 scans the tracks formed on the tape 9 accurately and stably.

The reproduction head 10 is used for reading the signal recorded on the tape 9 to produce a reproduction data Sfr. The reproduction data Sfr is then demodulated by the reproduction demodulator 11 to reverse the data modulation applied during recording, and is then input to the error corrector 12. The error corrector 12 corrects or compensates for any errors that occurred during the recording or reproducing process, and thus original formatted data Sf is reproduced. This reproduced signal Sf is then input to the deformatter 13.

The deformatter 13 extracts normal reproduction data Sn, high speed reproduction data Sh, and very-high speed reproduction data Sv from the data areas An, Ah, and Av of the reproduced signal Sf input thereto. Thus extracted data Sn, Sh, and Sv are further transferred to the reproduction demodulator 14, 14, and 16, respectively, wherein each extracted data is demodulated for playback. The switch 17 is operated to selectively connect either one of the demodulator 14, 15, and 16 to the output terminal 18 according to the user's instructions so as to send the selected signal Sn, Sh, or Sv for playback.

Figure 10:
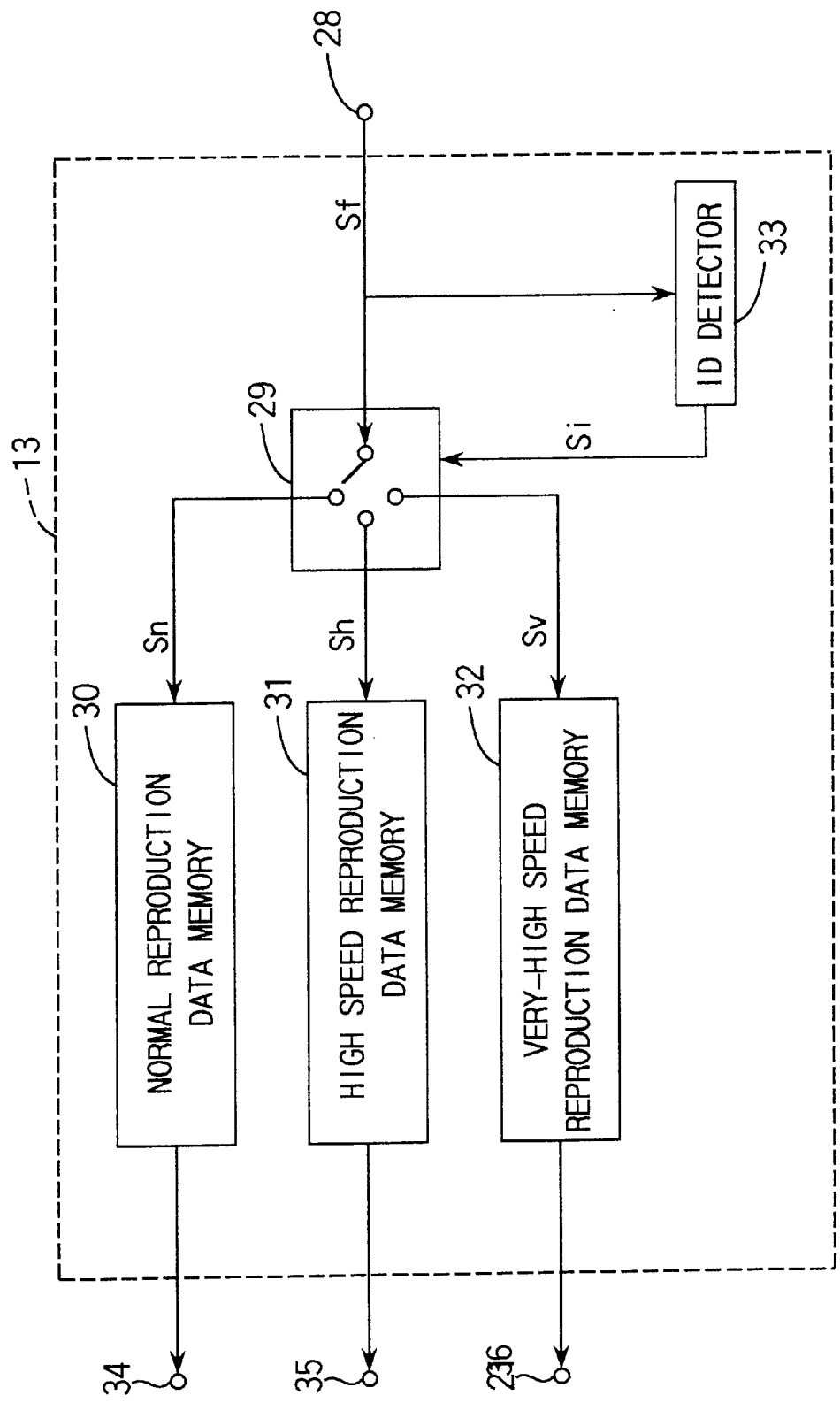
FIG. 10 is a block diagram showing a deformatter of the recording and reproducing apparatus shown in FIG. 1.
Figure 11:
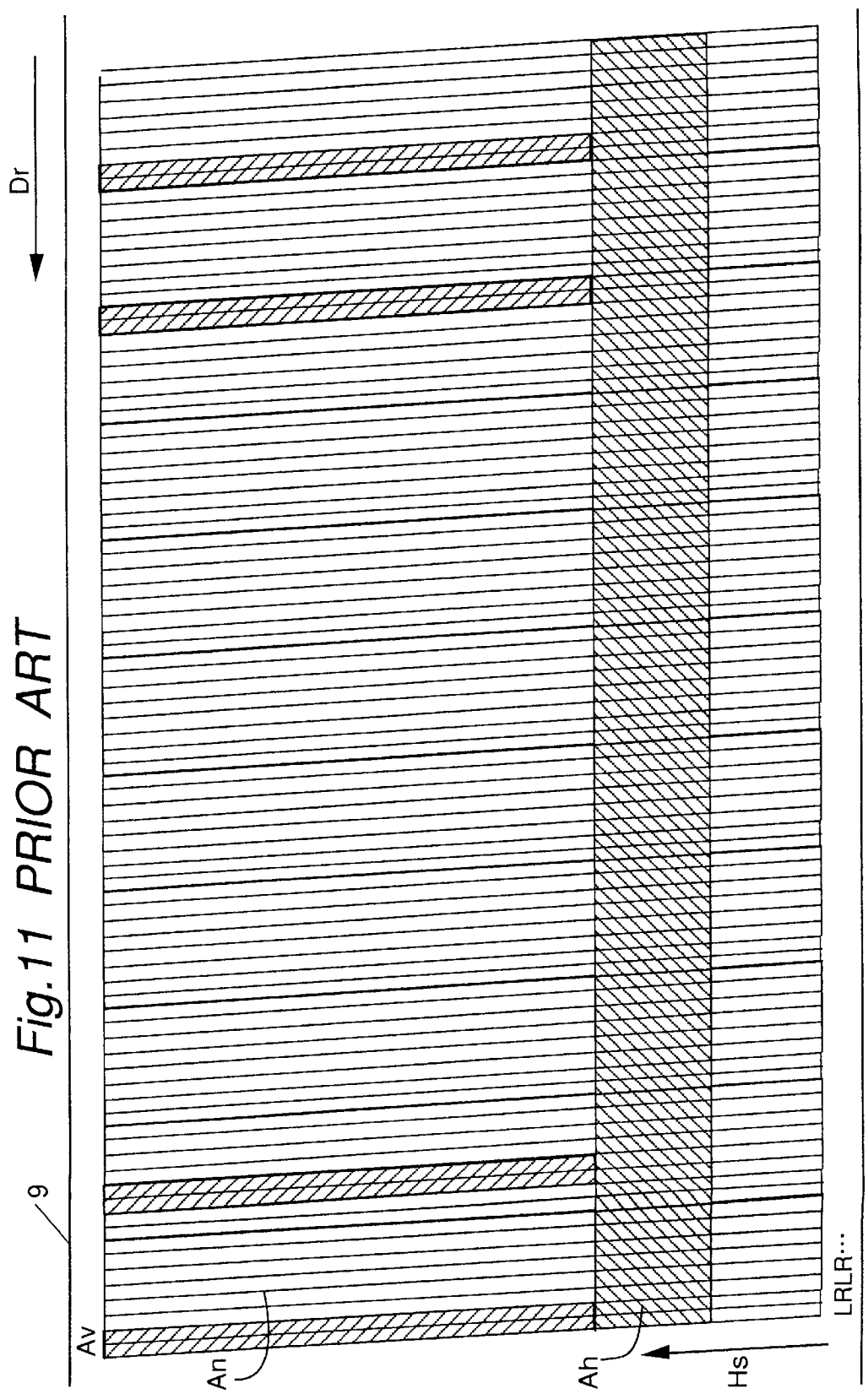
FIG. 11 is a map of the conventional tape pattern.

Referring to FIG. 10, details of the deformatter 13 is shown. The deformatter 13 includes an input terminal 28, reproducing data switch 29, normal speed reproduction data memory 30, high speed reproduction data memory 31, and very-high speed reproduction data memory 32, output terminals 34, 35, and 36, and an ID detector 33. The reproduction data Sf input from the input terminal 28 is transferred to the ID detector 33 and the switch 29. The ID detector 33 detects ID data indicative of each position of data Sn, Sh, and Sv included in the reproduced data Sf to produce a switch control signal Si which is transferred to the switch 29. Based on the switch control signal Si, the switch is operated to connect either one of memories 30, 31, and 32 so that the data currently input thereto can be supplied to the corresponding memory. For example, when a portion of normal reproduction data Sn of the reproduced signal Sf currently enters from the terminal, the switch 29 connect the terminal 28 to the normal speed reproduction data memory 30. Similarly, the switch 29 operates such that the high speed reproduction data Sh is supplied to the high speed reproduction data memory 31; and very-high speed reproduction data Sv to very-high speed reproduction data memory 32.

More specifically, the ID detector 33 also controls the switch 29 and memory writing such that the normal reproduction data Sn is written to the normal reproduction data memory 30, the high speed reproduction data Sh is written to the high speed reproduction data memory 31, and the very-high speed reproduction data Sv is written to the very-high speed reproduction data memory 32.

The ID detector 33 also executes memory read control to read from memory 30, 31, and 32 during normal, high speed, and very-high speed reproduction, respectively, and output the data through the corresponding output terminal 34, 35, and 36. The data read out from each output terminal is input to the corresponding demodulator 14, 15, and 16 for reversing the modulation applied during recording. The output from the demodulator is then input to the recording data switch 17, which is controlled to pass the demodulated data from the appropriate demodulator to the output terminal 18 during normal, high speed, and very-high speed reproduction.

With reference to FIGS. 3, 4, 5A, 5B, 5C, 6A, 6B, 6C, 7, 8, and 9, the recording operation of the recording and reproducing apparatus of FIG. 1, or the recording system Sw thereof, is described bellow.

At first, a mechanism used for helical scan recording and reproducing is described. As shown in FIG. 3, two heads, an R azimuth recording/reproducing head 38 and an L azimuth recording/reproducing head 39, are disposed to a rotating drum 37 to an 180 degree arc of which the tape-like recording medium 9 is wrapped at an angle. Note that these two recording/reproducing heads 38 and 39 functions as the recording head unit 8 (FIG. 1) during the recording operation, and as the reproducing head unit 10 (FIG. 1) during the reproducing operation. Diagonal tracks are thus formed on the tape-like recording medium 9 for signal recording and reproducing. As a result, the tape pattern recorded by this helical scan mechanism is obtained, as shown in FIG. 4. Note that the R and L azimuth tracks having different azimuth angle from each other are formed alternately.

In FIG. 4, the tape pattern recorded by this helical scan mechanism. Note that the R and L azimuth tracks are formed alternately. The areas hatched the oblique lines slating to the right are high speed reproduction data areas Ah for recording high speed reproduction data Sh therein. The areas hatched by the oblique lines slanting to the left are the very-high speed reproduction data areas for recording very-high speed reproduction data Sv therein. The remaining areas (not hatched) are the area Ah for recording the normal reproduction data Sn and other required data therein.

The recording head 8 moves in a scanning direction Hs diagonal with respect to the tape travel to record the formatted recording data Sf thereto. As a result, the high speed reproduction data Sh is thus recorded to a horizontal band parallel to the direction Dr of tape travel at the same position in each track. The very-high speed reproduction data Sv is recorded to intermittently selected tracks.

As shown in FIG. 5A, the high speed reproduction data Sh, a video signal for example, is comprised of plural data segments such as segment 0, 1, 2, 3, and so on. In FIG. 5B, the data arrangement in the high speed reproduction data areas Ah of FIG. 4 is shown, wherein the number in each data area Ah represents the number of segment recorded therein. Note that while the tracks are actually recorded at an angle, they are shown vertically in the figure for convenience only; in any event, this is not a fundamental problem.

The image data forming each segment is repeatedly recorded to plural tracks by segment unit within the area indicated by an arrow Ra. The number of repeated tracks m is eight in this embodiment. The arrows $T_L$ and $T_R$ indicate head paths when the tape speed is 4 times that of the normal reproduction speed. The solid arrows indicate the path of a head $H_L$ having L azimuth, and the dotted arrows indicate the path of a head $H_R$ having the R azimuth. Note that heads $H_L$ and $H_R$ are not shown for the sake of brevity. Because each head can only reproduce the data recorded to tracks with the same azimuth, each L head scan reproduces only part of the L track data as shown by the shading. The same is true for the R head: each R head scan reproduces only part of the R track data.

Each of reproduction heads L and R scans the area to which each segment is recorded once. The data reproduced from each head can be combined to reproduce one complete segment, and all data for each segment can therefore be reproduced.

By thus repeatedly recording the same data to plural tracks, all data for each segment can be reproduced without fixing the phase relationship between the tracks and head path at any even multiple of the normal reproduction speed that is one-half or less than the number of data repetitions.

As shown in FIG. 5C, the very-high speed reproduction data Sv is also comprised of plural data segments such as segment a, b, c, d, e, and so on. In FIG. 5D, the data arrangement in the very-high speed reproduction data areas Av is shown, wherein the character in each data area Av represents the segment recorded therein. The data forming each segment is recorded repeatedly to track pairs. A track pair identical to the first track pair is recorded once more 32 tracks after the first pair. As a result, the data for one segment is recorded to two pairs of tracks, and the data for the next segment is similarly recorded 3200 tracks after the first pair of tracks for the first segment.

As shown in FIG. 7, it is also possible to obtain the very-high speed reproduction data Sv irrespective of the position in the data area scanned by the reproduction head 10 because the same data is recorded repeatedly throughout the very-high speed reproduction data area Av. For example, the segment 'a' data comprises synchronization blocks a1, a2, a3, and a4, and insofar as four synchronization blocks can be reliably reproduced at any given speed, all four synchronization blocks a1, a2, a3, and a4 can be obtained, as shown by an upper arrow Tr shaded by the up-left oblique lines tightly arranged, irrespective of the phase relationship and where in the very-high speed reproduction data area Av the reproduction head 10 scans. In general, if the data repeat unit is set smaller than the amount of data that can be reproduced at a given tape speed, the same data (data for the same segment) can be obtained irrespective of where in the very-high speed reproduction data area Av the head 10 scans. In addition, if the same data is recorded to a pair of tracks comprising adjacent, reverse-azimuth tracks as shown in FIGS. 4 and 5D, the same data can be reproduced whether the L or R azimuth head is used for scanning.

Figure 8:
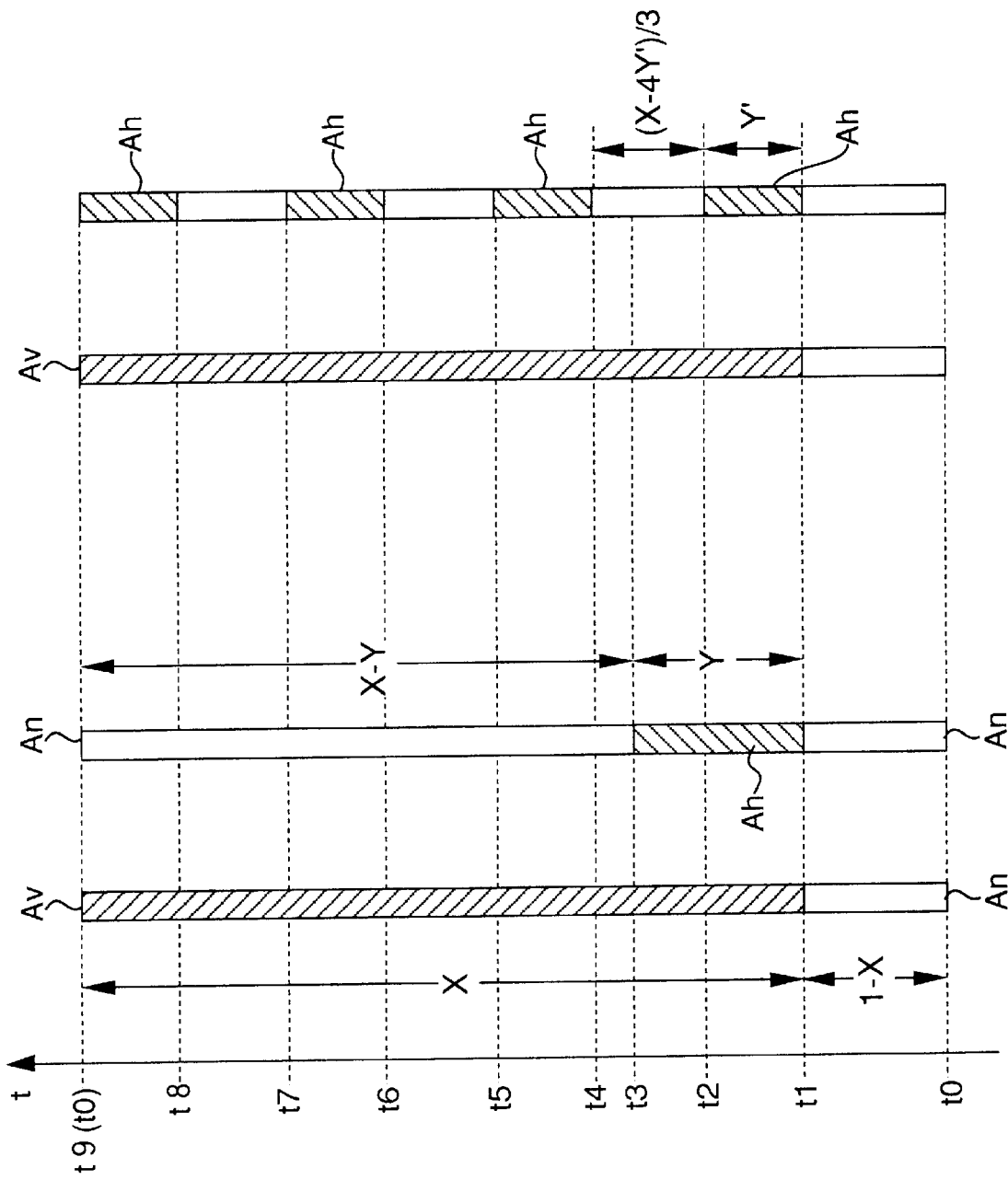
FIG. 8 is a timing chart of the memory read timing of the formatter of the recording and reproducing apparatus shown in FIG. 1.

This recording pattern can be formed on the tape-like recording medium 9 by controlling memory reading and operation of the switch 25 by means of the controller 26, so as to record the areas Av, An, and Ah, as shown on the left of FIG. 8. In FIG. 8, the lengths of the very-high speed reproduction data area Av and high speed reproduction data area Ah are expressed as 'X' and 'Y', respectively, when the track length of the tape 9 which is wrapped 180 degrees to the drum 37 is 1. Therefore, each length of areas An, Ah, Av in tracks are can expressed, shown in FIG. 8.

To thus record the first track in FIG. 8, the memories 22, 23, and 24 and switch 25 are controlled so as to read the normal reproduction data Sn from the memory 22 from time t0 to time t1; and to read the very-high speed reproduction data Sv from the memory 24 from time t3 to t9.

To record the second track in FIG. 8, the switch 25 is controlled to read the normal reproduction data Sn from the memory 22 from time t0 to time t1; to read the high speed reproduction data Sh from the memory 23 from time t1 to time t3; and to read the normal reproduction data Sn from the memory 22 from time t3 to t9.

The pattern shown in FIG. 4 can thus be recorded by controlling the memories 22, 23, and 24 and switch 25 shown in FIG. 2 as described above. The reproduction principle for the very-high speed reproduction data area Av thus recorded is described below with reference to FIG. 9.

Figure 9:
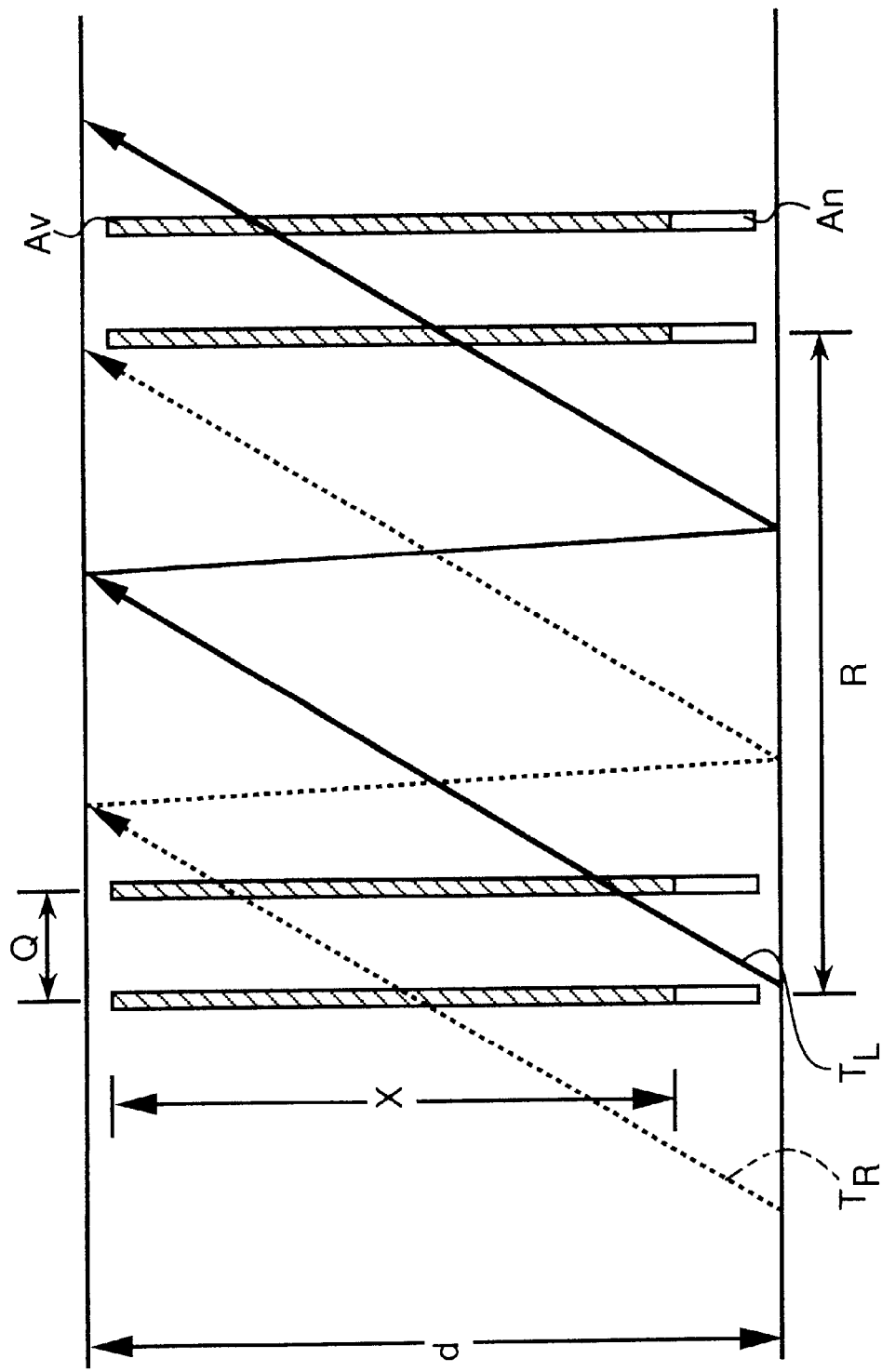
FIG. 9 is a graph in assistance of explaining the principle of the phase characteristics during very-high speed reproduction according to the present invention.

In FIG. 9 and below, the distance between the track pairs is Q tracks, and the ratio of the length of the very-high speed reproduction data area Av to the track length d recorded when the tape 9 is wrapped 180 degrees to the drum 37 is X (i.e., X=1/d where d is the track length when the tape is wrapped 180 degrees to the drum 37, and 1 is the length of the very-high speed reproduction data area). The track pairs are repeatedly formed on the tape at an interval of R tracks.

As a result, there is a tape speed at which one of the two track pairs to which the same data is recorded will always be scanned irrespective of the phase relationship between the head path and the tracks. If this speed is the Vi multiple of the normal reproduction speed, then Vi in the forward direction will be any speed in the range expressed by the following equation of $$+(Q/(i+X))+1 \leq Vi \leq +(Q/(i+1-X))+1 \quad (1),$$

where i is an integer including zero. And Vi in the reverse direction will be any speed in the range expressed by the following equation of $$-(Q/(i+1-X))+1 \leq -Vi \leq -(Q/(i+X))+1 \quad (2).$$

Note that X is ½ or greater.

Because each track pair records the same data repeatedly, if the repeat unit is shorter than the burst length reproducible at the reproduction speed, the same data (the data for one segment) can be obtained irrespective of what part of the track is scanned by the head.

Thus, variable speed reproduction whereby the high speed reproduction data Sv is reproduced during high speed reproduction; the very-high speed reproduction data Sv is reproduced during very-high speed reproduction; and the normal reproduction data Sn is reproduced during normal reproduction, can be achieved.

It is to be noted that while the high speed reproduction data area Ah and the very-high speed reproduction data area Av have been described separately above, the first recording pattern according to the present invention can be recorded by recording both areas to the same tape as shown in FIGS. 6A, 6B, and 6C.

Figure 26:
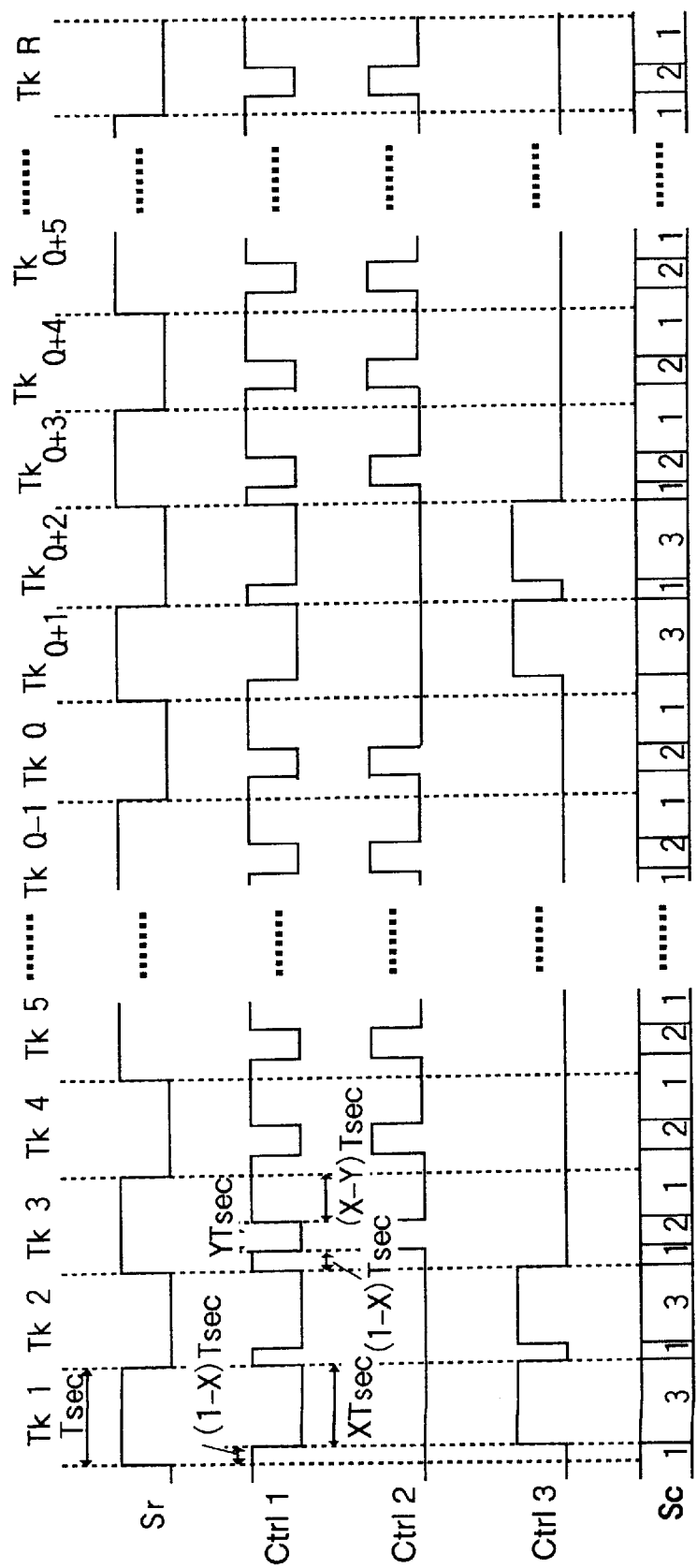
FIG. 26 is a graph showing various signals appeared in the recording and reproducing apparatus of FIG. 1 when forming the first data arrangement pattern.

Referring to FIG. 26, the wave forms of signals output from the controller 26 of the formatter 5 are shown. "T" is a half period of the reference signal Sr, and is 1/60 sec. when the frequency of signal Sr is 30 Hz. 'Q' is the distance between two neighboring very-high speed reproduction tracks forming a track pair. This track pair is repeated formed on the tape 9 at the predetermined interval R, as described with reference to FIG. 9. In this embodiment, the distance Q and the interval R are set to 32 tracks and 3200 tracks in this embodiment.

Since one track is formed in the tape 9 during the period T, the relationship between the each length of data areas An, Ah, and Av also corresponds to that of the time required for recording each of data areas An, Ah, and Av. In other words, sharing the half cycle period T for recording each of data Sn, Sh, and Sv according to each length thereof can form the data areas An, Ah, and Av having the predetermined lengths. This time sharing ratio including sharing schedule is determined based on the length X and Y, and is provided in a suitable means such as RAM or ROM used by the controller 26.

According to the time sharing ratio, thus provided, the controller 26 produces the timing signals Ctrl1, Ctrl2, and Ctrl3 and the control signal Sc based on the reference signal Sr. These signals Ctrl1, Ctrl2, Ctrl3, and Sc varies as follows:

In period Tk 1

Until time (1−X)T, the timing signal Ctrl1 is being "HIGH" and the control signal Sc is indicating the Ctrl1. During this period (1−X)T, the switch 25 connects the normal reproduction data memory 22 to read the normal speed reproduction data Sn therefrom to the terminal 27.

At time (1−X)T, timing signals Ctrl1 and Ctrl3 changes to "LOW" and "HIGH", respectively, and the control signal Sc changes its indication from Ctrl1 to Ctrl3. Then, the switch 25 disconnect the memory 22 and connects the very-high speed reproduction data memory 24 which outputs the data Sv therefrom at the leading edge of the timing signal Ctrl3 being supplied thereto. As a result, the normal reproduction data area An having the length (1−X) is formed on the first track Tk 1 of the tape 9. Note that the period T is a time for recording one track.

At time T which is XT after time (1−X)T, timing signals Ctrl1 and Ctrl3 changes to "HIGH" and "LOW", respectively, and the control signal Sc changes its indication from Ctrl3 to Ctrl1. Then, the switch 25 disconnects and connects the memories 25 and 22, respectively. As a result, the very-high speed reproduction data area Av having the length X is formed after the normal reproduction data area An on the first track Tk 1. Note that thus formed track Tk 1 corresponds to the first track shown in FIG. 8. During the entire period Tk 1, the second timing signal Ctrl2 is being "LOW".

In period Tk 2

The operation of the controller 26 is the same as that in the first period Tk 1. Thus, the second track Tk 2 having the same data format as the first track Tk 1 is formed.

In period Tk 3

At time (1−X)T, timing signals Ctrl1 and Ctrl2 changes to "LOW" and "HIGH", respectively, and the control signal Sc changes its indication from Ctrl1 to Ctrl2. This time, the third timing signal Ctrl 3 remains "LOW". Then, the switch 25 connects the high speed reproduction data memory 23 which outputs the high speed reproduction data Sh therefrom at the leading edge of the timing signal Ctrl2.

At time (1−X+Y)T which is YT after time (1−X+Y)T, timing signals Ctrl1 and Ctrl2 changes to "HIGH" and "LOW", respectively, and the control signal Sc changes its indication from Ctrl2 to Ctrl1. Then, the switch 25 turns to connect the memory 22.

At time T which is (X−Y)T after time (1−X+Y)T, timing signals Ctrl1 and Ctrl2 do not change and remains "HIGH" and "LOW", respectively, and the control signal Sc still indicates Ctrl1.

As a result, the normal reproduction data area An having the length (1−X), the high speed reproduction data area Ah having the length Y, and the normal reproduction data area An having the length (X−Y) are successively formed on the third track Tk 3. Note that thus formed track Tk 3 corresponds to the second track shown in FIG. 8. During the entire period Tk 3, the third timing signal Ctrl3 is being "LOW".

From period Tk 4 to period Tk Q

The operation of the controller 26 is the same as that in the third period Tk 3. Thus, (Q−3) number of tracks (Tk 4 to Tk Q) having the same data format as the first track Tk 1 are recorded on the tape 9.

In period Tk Q+1 and period Tk Q+2

The operation of the controller 26 is the same as that in the first period Tk1. Thus, the tracks Tk Q+1 and Tk Q+2 having the same data form as the first track Tk 1 are formed.

From period Tk Q+3 to period Tk R

The operations of the controller 26 is the same as that in the third period Tk 3. Thus, (R−Q−2) number of tracks (Tk Q+3 to Tk R) having the same data format as the third track Tk 3 are formed.

As a result, the tape pattern shown in FIG. 6C is obtained. It is needless to say that the recording pattern having any other data format can be obtained by suitably setting the time sharing ratio data according to the desirable data format. Examples of such data format other than that of FIG. 6C are shown in FIGS. 13C, 14, 15C, 16C, and 17, which will be described later.

Although the time sharing ratio data is stored in memory means such as RAM or ROM in this embodiment, it is also possible to provide such sharing ratio data in a form of circuit means as a sequencer and so on.

According to the recording and reproducing apparatus according to the present invention, the actual reproduction speed parameters of the very-high speed reproduction data area thus recorded range as follows, assuming i=0, Q=32, and X=0.6:

forward, +54.3 to +81 times normal reproduction speed, reverse, −79 to −52.3 times normal reproduction speed;

when i=0, Q=32, and X=0.8:

forward, +41 to +161 times normal reproduction speed, reverse, −159 to −39 times normal reproduction speed.

It is therefore known that as X increases, the reproducible tape speed range also increases. Increasing X, the width of this band increases and a wider reproduction range can be achieved.

Referring to FIGS. 12A, 12B, 12C, 12D, 13A, 13B, and 13C, another tape pattern including data format recorded by the recording and reproducing apparatus according to the present invention is shown. This pattern differs from the pattern shown in FIG. 6C only in the format of the data in the high speed reproduction data area Av. Specifically speaking, FIGS. 12A and 12C are identical to FIGS. 5A(6A) and 5C(6B), respectively. FIGS. 12B and 12D are similar to FIGS. 5B and 5D, respectively, wherein the data arrangement in the high speed reproduction data areas Ah. The image data forming each segment is repeatedly recorded to plural tracks of the same azimuth by segment unit. The number of repeated tracks m is sixteen in this embodiment. The arrows TL indicates the head $H_L$ path when the tape speed is 3.5 times that of the normal reproduction speed. Because each head can only reproduce the data recorded to tracks with the same azimuth, each L head $H_L$ scan reproduces only part of the L track data as shown by the hatching.

During the first scan, reproduction head $H_L$ reproduces part of the area recording each segment, and during the second scan reproduces the part that could not be captured with the first scan because the head scans the track at a 180 degree different phase. The data reproduced from each scan can be combined to reproduce one complete segment, and all data for each segment can therefore be reproduced.

The other reproducing head $H_R$ similarly captures the data from the R-azimuth tracks.

By thus repeatedly recording the same data to plural tracks, all data for each segment can be reproduced at any multiple of H+0.5 (where H is a natural number) of the normal reproduction speed that is one-half or less than the number of data repetitions without fixing the phase relationship between the tracks and head path.

In the first tape pattern of FIG. 6C, all data for one segment is reproduced with one scan of the R and L heads, but in this pattern of FIG. 12D all data is reproduced by two scans by the same-azimuth head.

Figures 13A, 13B, 13C:
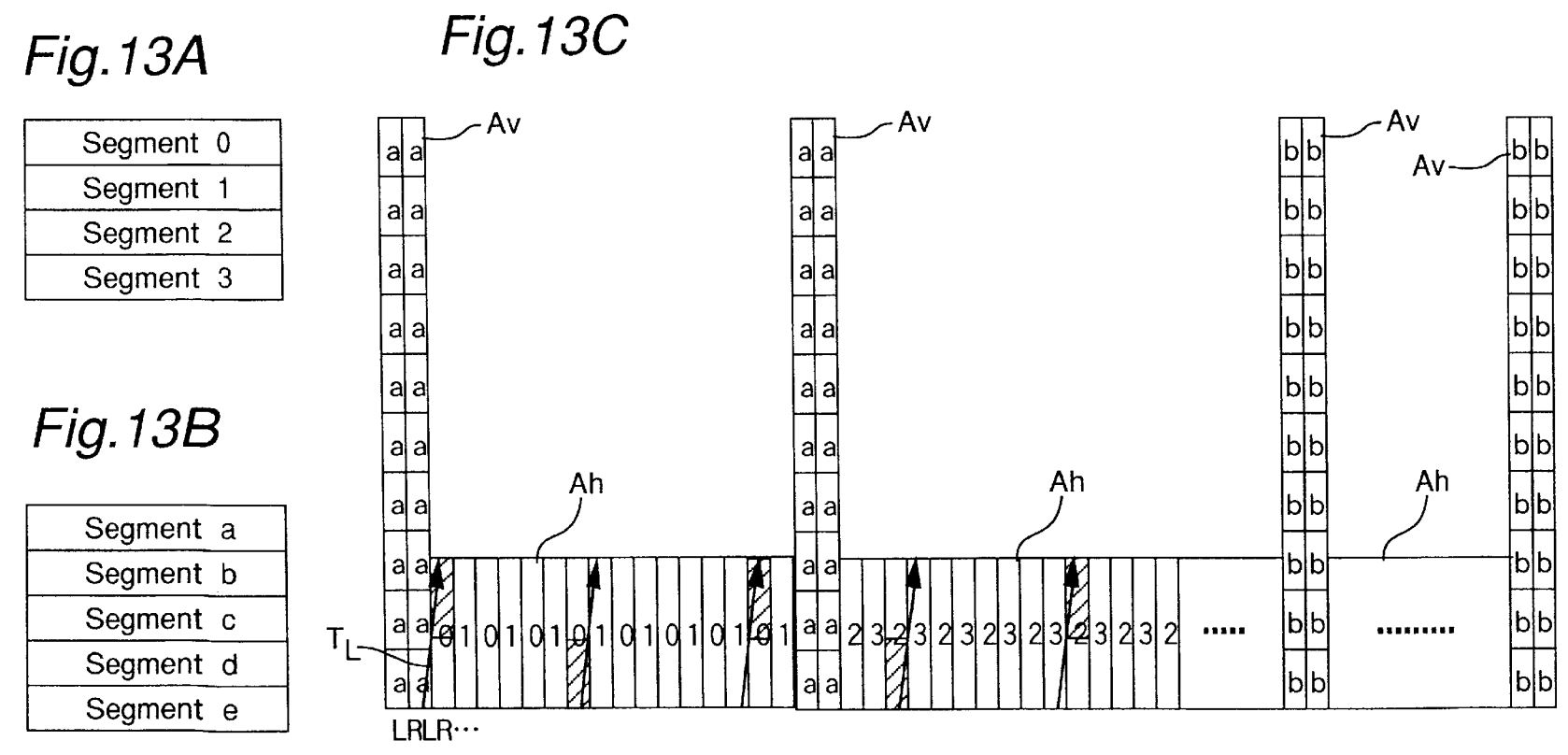

It is to be noted that while only the high speed reproduction data area has been described above, the second preferred recording pattern can be achieved by recording both areas simultaneously to the same tape as shown in FIG. 13C, wherein FIGS. 13A and 13B are identical to FIGS. 12A and 12B, respectively.

In the first tape pattern (FIG. 6C) one segment is reproduced by scanning the tape once each with 180-degree different phase R- and L-azimuth heads, and then combining the captured data. If the phase of these heads is offset from 180 degrees, however, it is difficult to capture data that can be effectively combined. By means of this second tape pattern (FIG. 13C) however, the high speed reproduction data area can be formed by scanning each segment twice with the same-azimuth head, and all segment data can therefore be reliably reproduced.

The increase in the very-high speed reproduction range achieved by the first pattern (FIG. 6C) above relative to the conventional recording and reproducing method is also achieved by means of this second pattern (13C).

Figure 14:
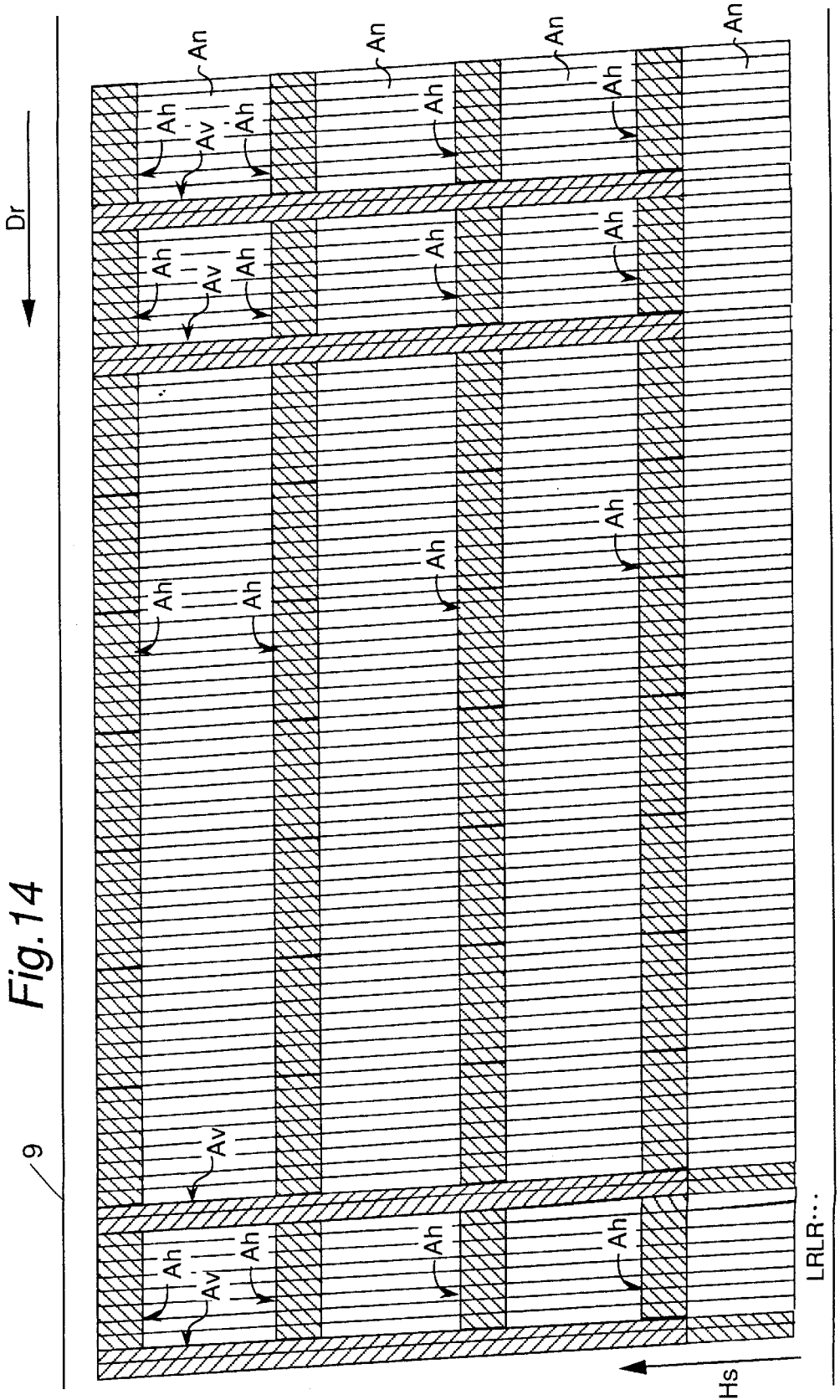
FIG. 14 is a map of alternative tape pattern recorded by the recording and reproducing apparatus according to the present invention.
Figure 15A:
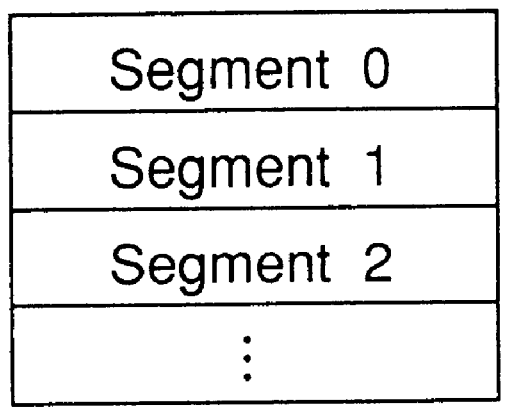
FIG. 15A is graph showing data segments for the high speed reproduction according to the present invention.
Figure 15B:
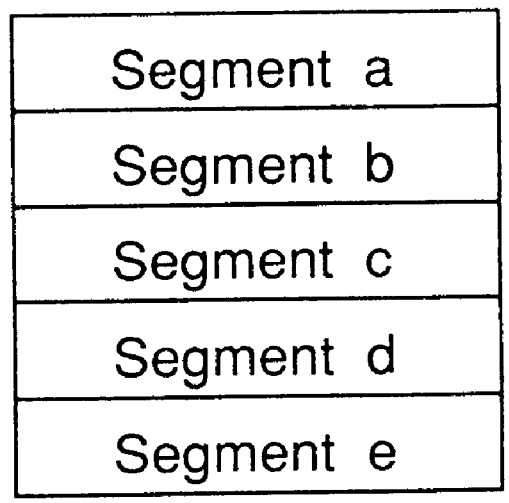
FIG. 15B is graph showing data segments for the very-high speed reproduction area according to the present invention.

Referring to FIGS. 14, 15A, 15B, and 15C, still another tape pattern including data format recorded by the recording and reproducing apparatus according to the present invention is shown. FIGS. 15A and 15B are identical to FIGS. 12A and 12C, respectively. This third tape recording pattern differs from the first and second patterns shown in FIGS. 6C and 13C, respectively, in that the number of high speed reproduction data areas Ah (horizontal bands) is increased to four, as best shown in FIG. 14. In addition, these areas can be located anywhere in the tracks.

Figure 15C:
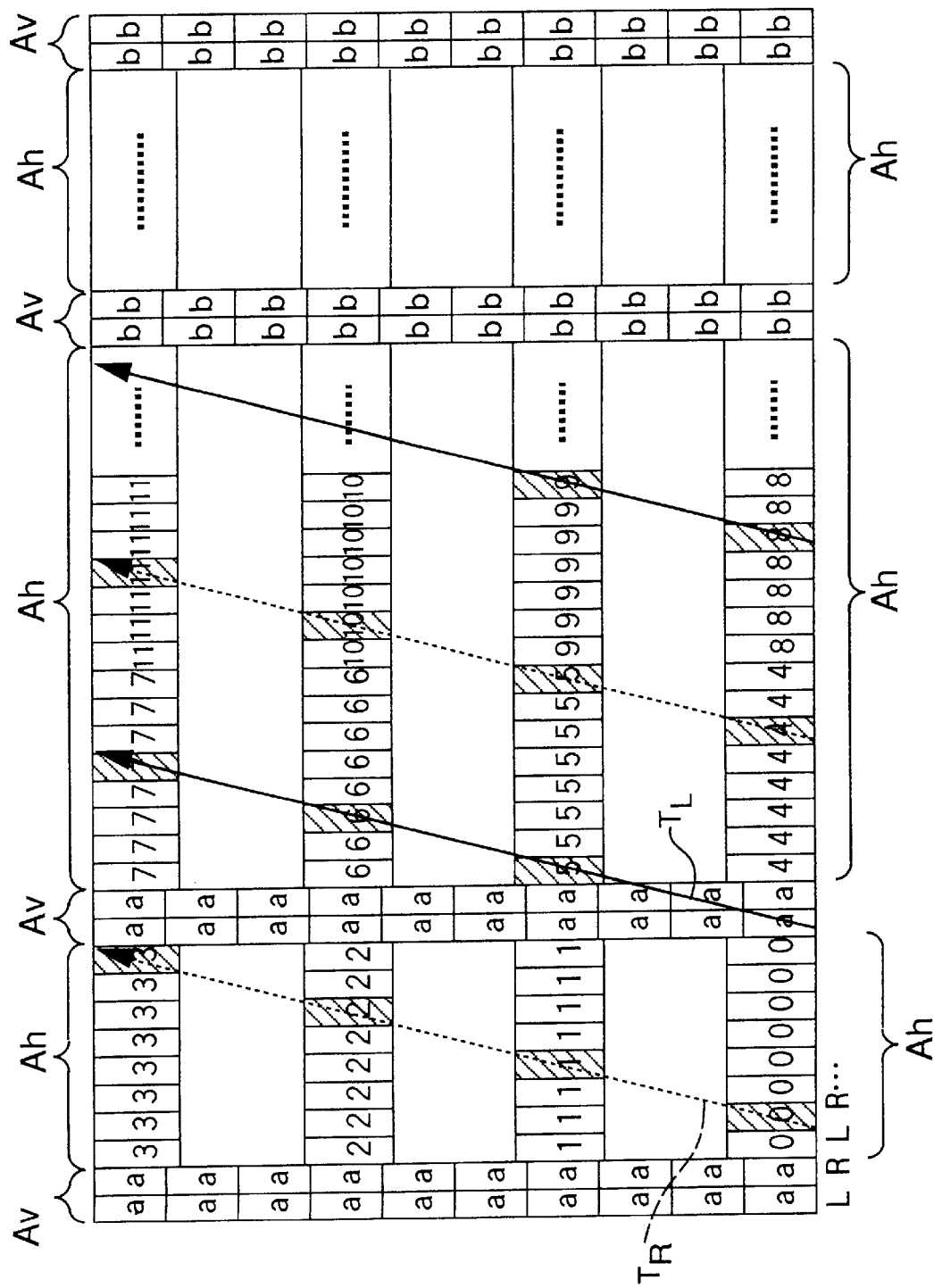
FIG. 15C is a graph showing a conceptual map of the third data arrangement pattern formed by the recording and reproducing apparatus according to the present invention.

In FIG. 15C, the format in FIG. 14 is shown in detail. As shown in the first and second tape patterns, the very-high speed reproduction data areas Av are inserted where the recording segments of high speed reproduction data area Ah change (e.g., in FIG. 15C, between segments 0 and 4, segments 1 and 5, segments 2 and 6, and segments 3 and 7 in the high speed reproduction data area), thus breaking up the horizontal bands.

Even when the very-high speed reproduction data areas Av are thus placed, all data for each segment can be reliably captured at any even-multiple reproduction speed that is one-half or less of the number of repeat tracks (eight tracks in this example) because the continuous horizontal pattern of the high speed reproduction data is maintained for any given segment. In addition, if the phase relationship of the tracks and head path is locked at an odd-multiple reproduction speed (seven times the normal reproduction speed in this example) not exceeding the number of track repetitions, as indicated by the arrows in the figure, the maximum tape speed during high speed reproduction can be set to the range between said even-multiple reproduction speed that is one-half or less of the number of repeat tracks and said odd-multiple reproduction speed not exceeding the number of track repetitions insofar as the band width is controlled to not exceed the burst width that can be captured at that tape speed multiple. It should also be noted that the tape speed multiples made reproducible by phase locking control are not limited to the multiples described above, though further description thereof is omitted below.

The block structure required for recording and reproducing using this pattern is identical to that shown in FIGS. 1, 2, and 10. The method of controlling the formatter 5 does, however, differ. This tape pattern is formed by combining the tracks as shown on the right of FIG. 8.

To form the recording pattern shown in FIG. 14 on tape, it is sufficient to control memory reading and switch operation by means of the controller 26, as described above, in the pattern indicated by the third and fourth tracks shown on the right of FIG. 8.

To record the third track in FIG. 8, the switch 25 and memories are controlled to read the normal reproduction data Sn from the memory 22 from time t0 to time t1; and to read the very-high speed reproduction data Sv from the memory 24 from time t1 to t9.

To record the fourth track in FIG. 8, the switch 25 and memories are controlled to read normal reproduction data Sn time t0 to time t1, from time t2 to t4, from t5 to t6, and from t7 to t8; and to read the high speed reproduction data Sh from time t1 to t2, from t4 to t5, from t6 to t7, and from t8 to t9.

By thus controlling the operation of the memories 22, 23, and 24 and switch 25 shown in FIG. 2, signals can be recorded to the pattern shown in FIG. 14. This pattern can then be reproduced by means of the recording and reproducing apparatus of FIG. 1.

Figure 27:
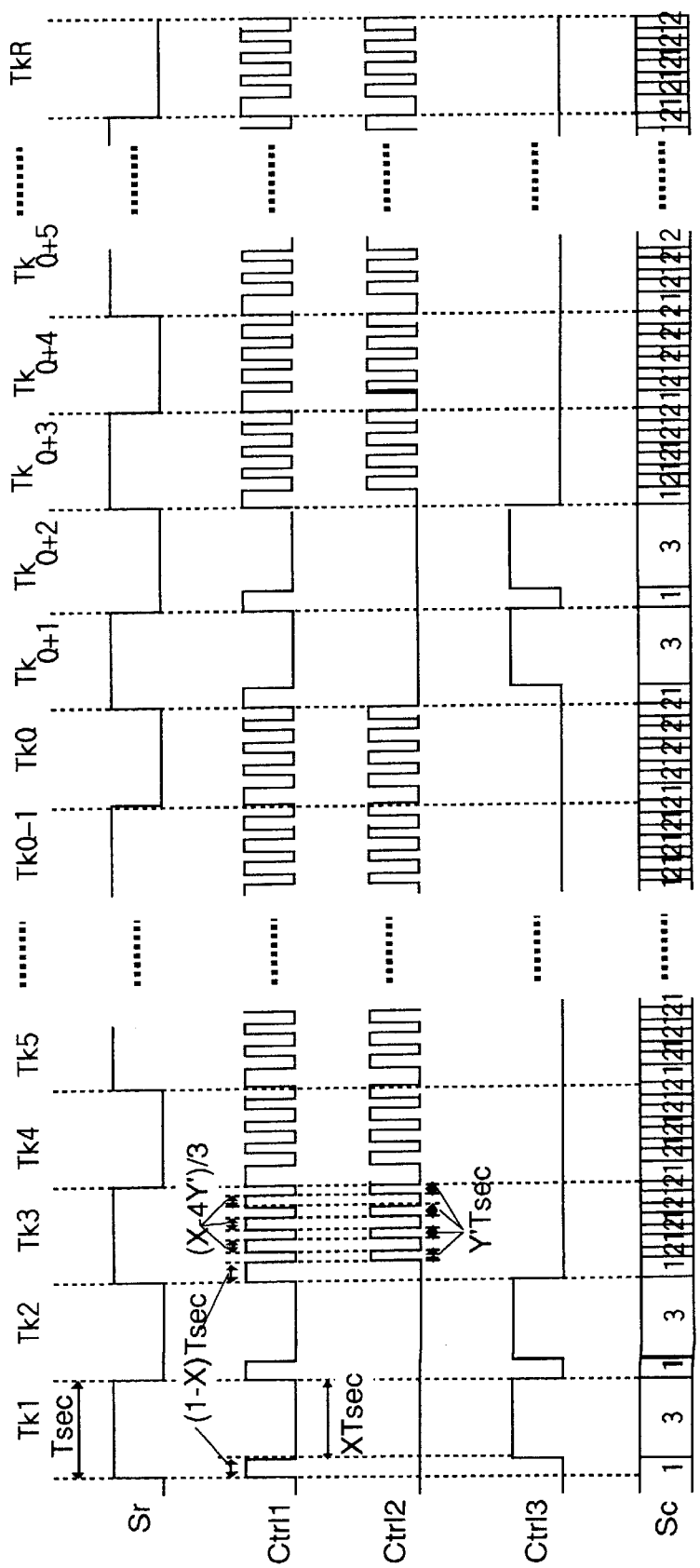
FIG. 27 is a graph showing various signals appeared in the recording and reproducing apparatus of FIG. 1 when forming the third data arrangement pattern.

Referring to FIG. 27, the wave forms of signals output from the controller 26 of the formatter 5 for forming this third tape recording pattern are shown.

In addition to the same high speed reproduction rate achieved by the first tape pattern, high speed reproduction at an odd multiple of the normal reproduction speed not exceeding the maximum number of track repetitions of the data can be achieved by additionally controlling the phase relationship between the head path and tracks. The speed range for very-high speed reproduction can also be increased as in the first and second preferred tape patterns above.

Figure 16A:
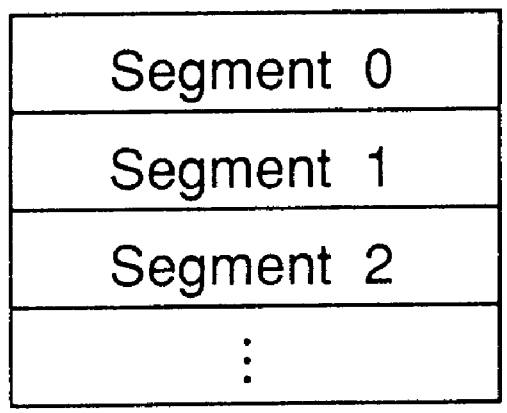
FIG. 16A is graph showing data segments for the high speed reproduction according to the present invention.
Figure 16B:
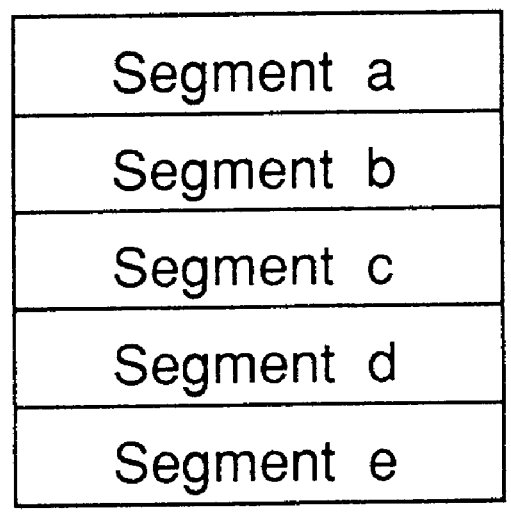
FIG. 16B is graph showing data segments for the very-high speed reproduction area according to the present invention.
Figure 16C:
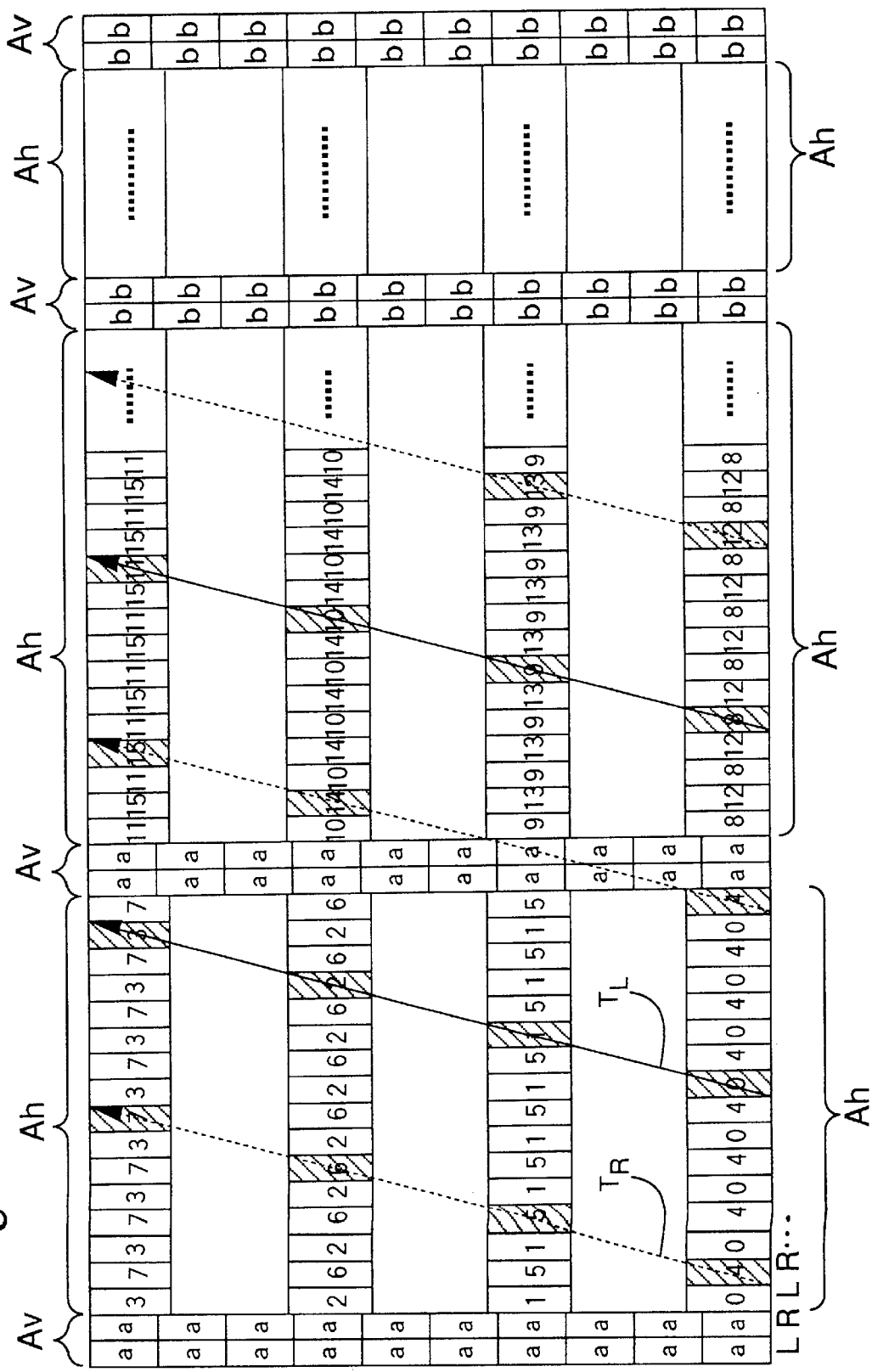
FIG. 16C is a conceptual map of the fourth data arrangement pattern formed by the recording and reproducing apparatus according to the present invention.

Referring to FIGS. 16A, 16B, and 16C, further another tape pattern including data format recorded by the recording and reproducing apparatus according to the present invention is shown. FIGS. 16A and 16B are identical to FIGS. 12A and 12C, respectively. This fourth tape pattern differs from the third tape patterns showing in FIG. 15C only in the format of the data in the high speed reproduction data area Av.

In FIG. 16C, the fourth recording pattern is shown. This recording pattern is essentially the recording pattern of the third recording pattern with the repeat pattern of the second pattern inserted to the high speed reproduction data area Av of the recording pattern of the third pattern. More specifically, as shown in FIG. 16C, the high speed reproduction data area Av comprises plural horizontal bands as in the third recording pattern with the data format in each horizontal band repeatedly recording the same data by segment unit to tracks of the same azimuth.

Applying the same principle applied in the second recording pattern above, all high speed reproduction data Sv for each segment can be reproduced without fixing the phase relationship between the tracks and head path at any multiple of H+0.5 (where H is a natural number) of the normal reproduction speed that is one-half or less than the number of data repetitions.

Furthermore, if the phase relationship of the tracks and head path is locked, all segment data can be reproduced at an odd-multiple reproduction speed not exceeding the number of track repetitions. The arrows $T_R$ and $T_L$ in FIG. 16C show the head path with the phase locked at seven times the normal reproduction speed, and demonstrate that the data for all segments can thus be reproduced. Reproduction of the very-high speed reproduction data areas Av is identical to that described in the first through third recording patterns, and the speed range for very-high speed reproduction can also be increased as described in the third recording pattern. The means for recording and reproducing with this pattern is identical to that required for the third recording pattern.

In the first and third tape recording patterns, all data in any one segment is reproduced by scanning each segment once each with the R and L heads $H_R$ and $H_L$. In the second and fourth tape recording patterns, however, all data in any one segment is reproduced by scanning each segment twice with the same-azimuth head.

In the first and third recording patterns, one segment is reproduced by scanning the tape once each with 180-degree different phase R- and L-azimuth heads, and then combining the captured data. If the phase of these heads is offset from 180 degrees, however, it is difficult to capture data that can be effectively combined. By means of the second and fourth recording patterns, however, the high speed reproduction data area can be formed by scanning each segment twice with the same-azimuth head, and all segment data can therefore be reliably reproduced.

The increase in the very-high speed reproduction range achieved relative to the conventional recording and reproducing method is also achieved by means of this fourth recording pattern, as described with reference to the first recording pattern.

Figure 17:
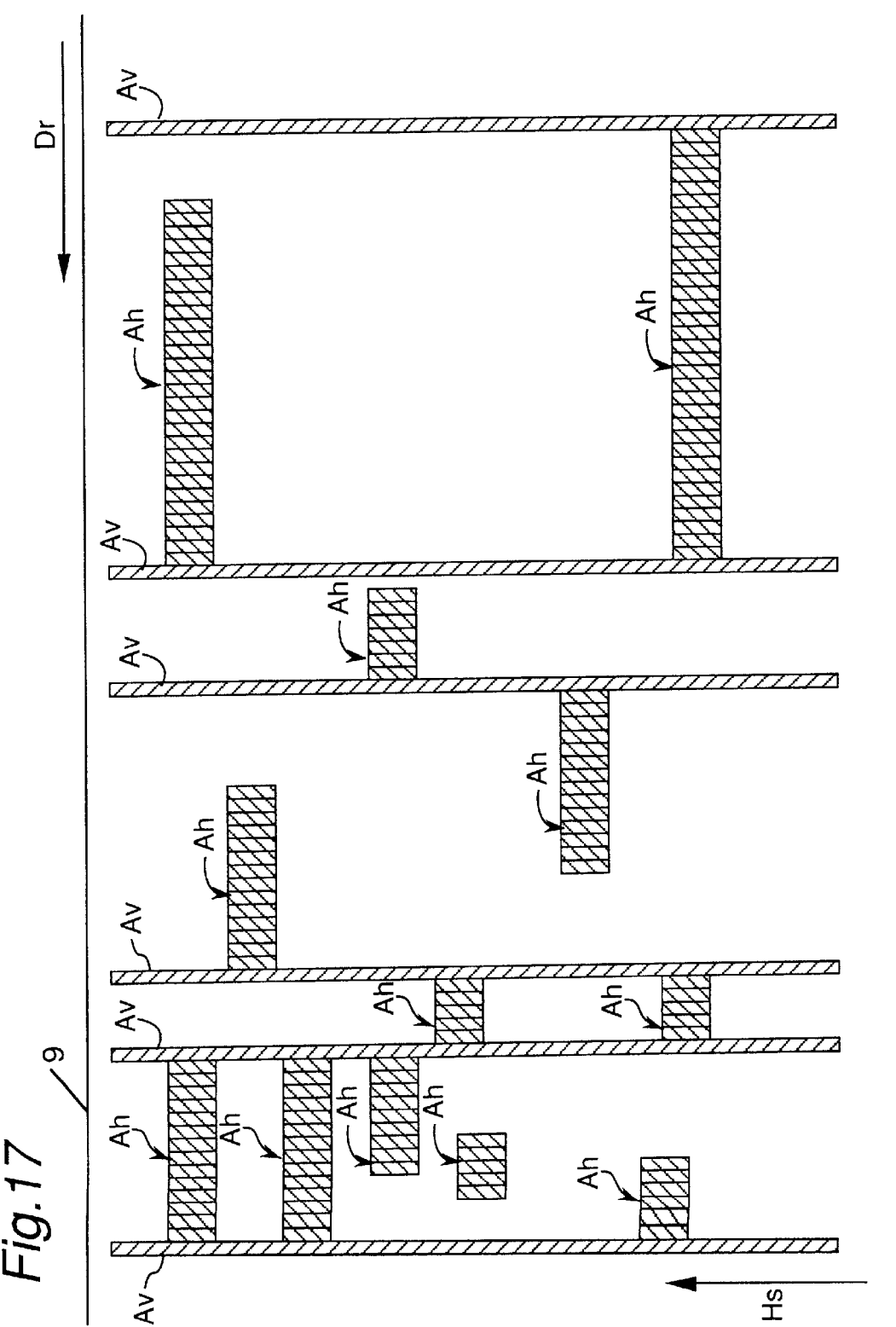
FIG. 17 is a graph showing a map of the preferred tape pattern recorded by the recording and reproducing apparatus according to the present invention.

More generally, as shown in FIG. 17, if the very-high speed reproduction data area Av comprises intermittently selected tracks, the speed range can be determined according to the length and period between the tracks. In addition, as also shown in FIG. 17, if the high speed reproduction data areas Ah are recorded with the data for each segment recorded repeatedly in the track direction, the high speed reproduction data areas Ah can be recorded at any position on the tape 9. The reproducible tape speeds are determined by the number of repetitions.

Figure 18:
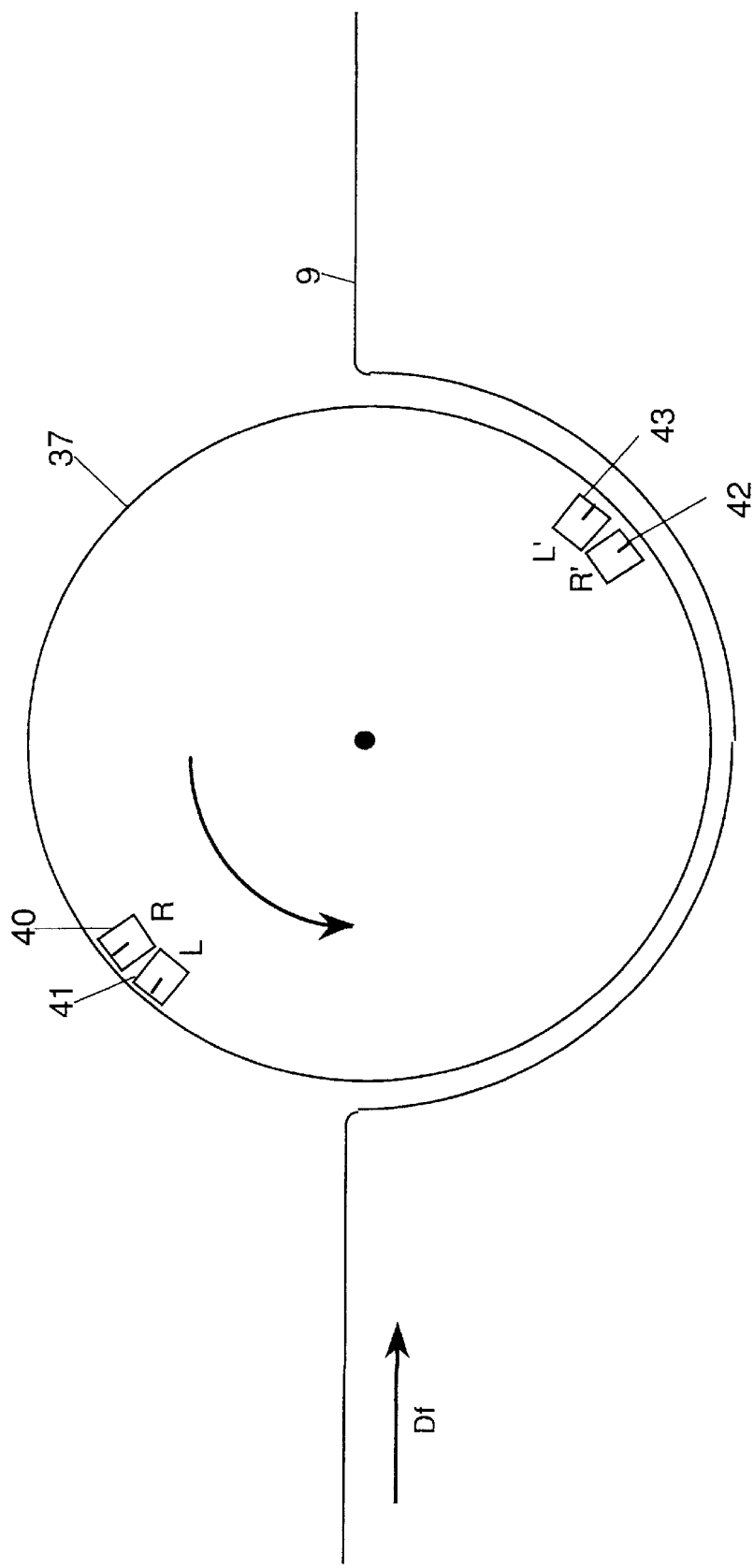
FIG. 18 is a conceptual diagram showing an alternative tape scanning mechanism.

As shown in FIG. 18, recording and reproducing can also be achieved by means of a drum 37 having four heads 40, 41, 42, and 43. The R heads 40 and 42 have R azimuth, and are opposed to each other with respect to the drum center. Similarly, the L heads 41 and 43 having L azimuth are opposed to each other. The tape is fed in a direction Df. It follows that the reproducible tape speeds achievable with this four head drum 37 may differ as a result of the different head configuration. Another possible head configuration is to provide only two heads disposed as shown by heads 40 and 41 (R and L, respectively) in FIG. 18. By segmenting the high speed reproduction data area Ah and making the very-high speed reproduction data areas Av as long as possible as in the present embodiment, the tape speed range available for very-high speed reproduction can be expanded.

Because the number and position of the high speed reproduction data Sh can be set freely, the high speed reproduction data area Ah can be expanded without affecting the area for very-high speed reproduction data Sv. By increasing the number of high speed reproduction data areas Ah (the number of horizontal bands), the amount of high speed reproduction data Sh can be increased; as a result, high image quality high speed reproduction and high speed reproduction with a short image refresh cycle can be achieved. It is also possible to increase the tape speed by applying phase lock control.

Second Embodiment

Figure 19:
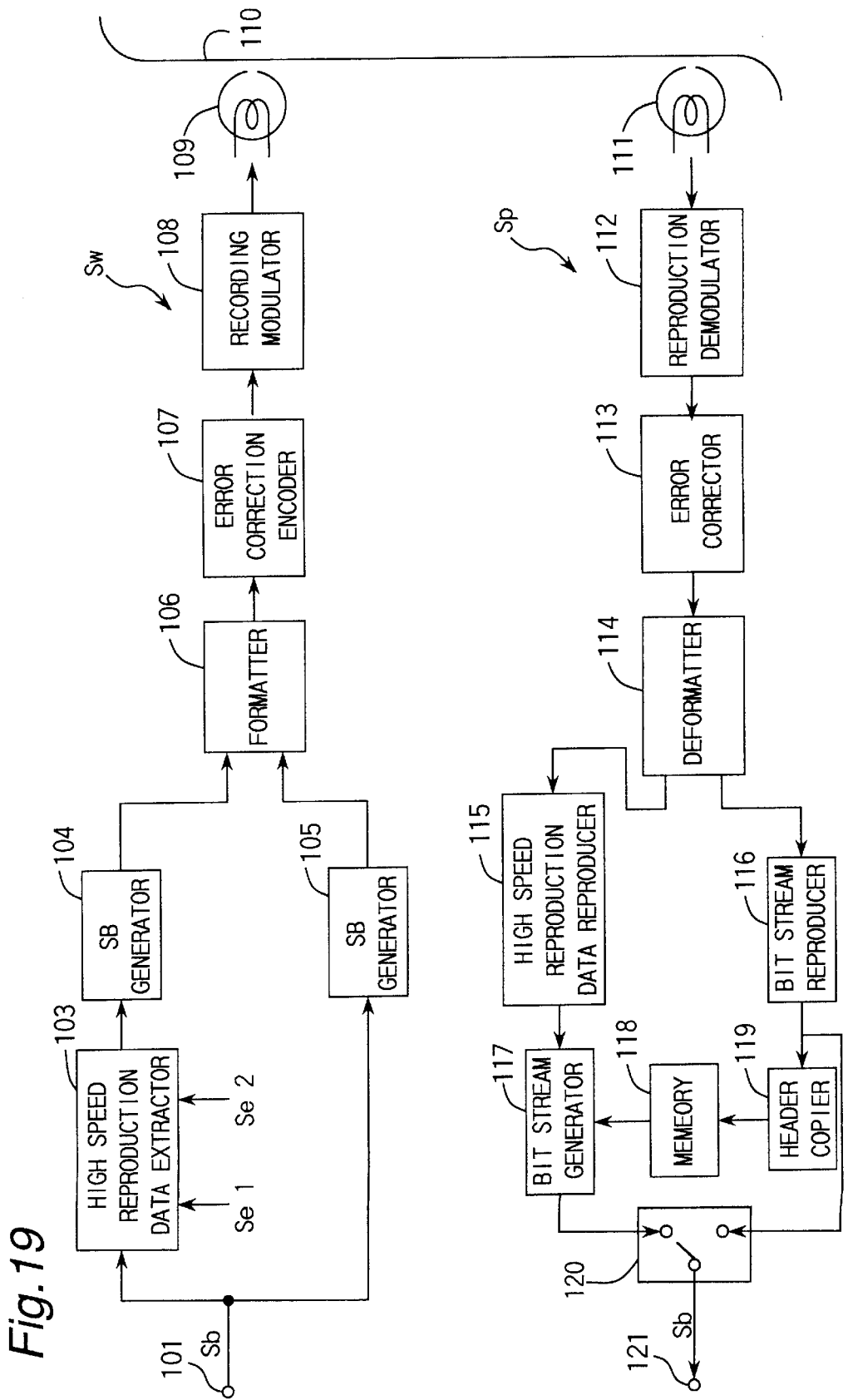
FIG. 19 is a block diagram showing a recording and reproducing apparatus according to a second embodiment of the present invention.

Referring to FIG. 19, an alternative of recording and reproducing apparatus of FIG. 1 is shown. The recording system Sw includes an input terminal 101 for receiving a bit stream Sb, a high speed reproduction data extractor 103, and a high speed reproduction SB (synchronization block) generator 104, a normal speed reproduction SB (synchronization block) generator 105, formatter 106, an error correction encoder 107, a recording modulator 108, and a recording head 109. The alternative embodiment is described below with reference to recording only the normal reproduction data and the high speed reproduction data. It is to be noted that, except for the physical position to which the data is actually recorded, the very-high speed reproduction data area is identical to the high speed reproduction data area; the same recording method can therefore be applied, and separate description thereof is omitted below.

Referring to FIG. 20, the format of the bit stream Sb input to the input terminal 101 is shown. The following description is based on using an MPEG-like bit stream. As shown in FIG. 20, the MPEG bit stream Sb has a hierarchical structure in which the actual picture data comprising the data for one frame is stored at the lowest level of the hierarchy, a Group Of Pictures (GOP) comprising a group of plural picture data blocks PD occupies the next level of the hierarchy. Plural GOP are combined as the video data VD that is formatted with the audio data AD and other information to create the transferred bit stream Sb. This "other information" includes header information identifying the contents of the data following the header information. GOP includes a GOP header GH and a GOP data GD. The bit stream Sb includes the video data VD and a video header VDH, the audio data AD and an audio header ADH, and a system header SYH.

For example, a picture header PH expressing the content of the picture data block PD is transferred at the beginning of the picture data. The picture data PD may be either intra-frame compressed picture data or inter-frame compressed picture data. The intra-frame compressed picture data is data compressed using only the data contained within that one picture data frame; inter-frame compressed picture data is obtained by compressing the information describing the differences between the current frame and the before and/or after frames. Normally, the first picture data in the GOP is intra-frame compressed picture data, and the remaining picture data is inter-frame compressed picture data.

The intra-frame compressed image data whereby a complete frame can be reproduced from that data alone is used during high speed reproduction. Specifically, the high speed reproduction data extractor 103 extracts part of the intra-frame compressed image data in the picture data PD of the input bit stream shown in FIG. 20 as the high speed reproduction data; the header data PH is not extracted as part of the high speed reproduction data.

With reference to FIGS. 21A, 21B, 21C, and 21D, the configuration and operation of the high speed reproduction data extractor 103 is described below. As shown in FIG. 21A, the extractor 103 includes an input terminal 122 for receiving the bit stream Sb, a variable length decoder (VLD) 123, a low band extractor 124, a high bit extractor 125; a VLC circuit 126, an input terminal 310 for receiving a first extraction signal Sel indicative of the number of low band coefficients to extract, an input terminal 312 for receiving a second extraction signal Se2 indicative of number ob high bits to extract, an extraction controller 314, and an output terminal 12 which are connected to each other, as shown in FIG. 21A.

The picture data PD is normally discrete cosine transformation (DCT) coded in 8×8 pixel units, and is then variable length coded (VLC). The first step is therefore to reconvert the data from variable length coded data to fixed length coded data by means of the variable length decoder (VLD) 123.

After VLD, the data is expressed by 64 eight-bit long coefficients, as shown in FIG. 21B, wherein each coefficient is 8 bit. Of these 64 coefficients, only the low frequency component coefficients are usually needed for high speed reproduction. Based on the first extraction signal Sel, the low band extractor 124 therefore extracts, for example, the six low band coefficients (DC, A10, A01, A02, A11, A20), and sets the remaining high band coefficients to zero (0), as shown in FIG. 21C, wherein each coefficient is 8 bit. It is to be noted that the number of low band coefficients shall not be limited to six, and may be three, four, or any other appropriate number.

The high bits of the data containing only the low band components are then extracted by the high bit extractor 125 based on the second extraction signal Se2; in this example, the high five bits are extracted, as shown in FIG. 21D, wherein each coefficient is 5 bit. Note that the invention shall not be so limited to five bit.

After high bit extraction, based on the first extraction signal Sel, the controller 314 controls the VLC circuit 16 to apply variable length coding to each coefficient of thus extracted high bit. Note that the DC coefficient is fixed-length coded, for example 5 bit, for greater error resistance during recording and reproducing. Similarly, A10 and A01 coefficients are 3 bit VLC1; A02 coefficient is 6 bit VLC2; A11 coefficient is 2 bit VLC3; and A20 coefficient is 4 bit VLC.

The high frequency component of the variable length coded data is necessarily zero (0) as a result of this coding process, and the last variable length coded data in the block therefore functions as the end-of-block (EOB) flag marking the end of the block. As shown in FIG. 21C and 21D, a 4-bit EOB is always added. However, because it is known that this EOB flag is always added, demodulation on the reproduction side is often possible even if it is not recorded.

An ID is then added by the SB generator 104, as shown in FIGS. 22A, 22B, 22C, and 22D, to the extracted high speed reproduction data Sd, and the bit stream Sb is divided into synchronization blocks for each DC and AC coefficient. Each synchronization block has a predetermined length Lf. In this example, with respect to the AC coefficients, after VLD, the high band coefficients are removed, the number of DCT coefficients is held constant, VLC is repeated, and the EOB is removed. If the high band code is removed by Huffman code unit without applying VLD, the EOB codes can be removed with no problem. In this case, the number of Huffman code units must be constant.

Figure 22A:
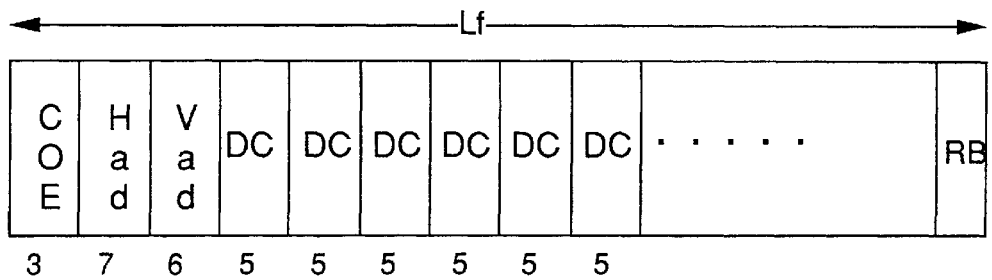
FIG. 22A is a map of the synchronization blocks for the DC component.
Figure 22B:
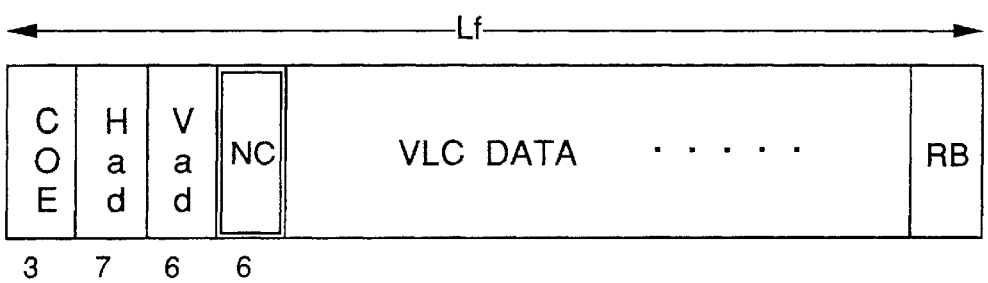
FIG. 22B is a map of the synchronization blocks for the AC component.

For example, the synchronization blocks storing the high speed reproduction DC coefficients are shown in FIG. 22A. The synchronization blocks storing the high speed reproduction AC coefficients are shown in FIG. 22B. The synchronization blocks shown in FIGS. 22A and 22B, respectively, store the DC components (fixed length, high 5 bits) and the AC components (variable length coded, no EOB) for plural DCT blocks. Each synchronization block starts with a 3-bit ID identifying the content of that synchronization block. For example, a COE of '000' indicates a DC component, while '001' indicates an AC component. The following 13-bit Had and Vad codes store the screen address of the first picture data stored in the synchronization block. If the screen display sequence of the coefficients stored to the synchronization block is predetermined, the screen address of every other coefficient can be easily calculated from the address of the first display data.

Because the data content per synchronization block is constant when the data is coded by fixed-length coding, as are the DC coefficients, it is possible to avoid processing the buffer bits (which are inserted when using variable length coding) in error. However, with the variable length coding applied to the AC coefficients, the number of buffer bits added will vary with the actual data content. It is possible in this case to erroneously process these buffer bits as actual code data.

Therefore, by recording these buffer bits with a code differing from the variable length coded data, mistakenly decoding these buffer bits as variable length coded data during reproduction can be prevented. For example, if the buffer bits are all set to '0' to simplify the hardware configuration, decoding errors can be prevented because codes starting with '0' are not found within the variable length coded data.

When codes starting with '0' are found within the variable length coded data, as may occur with JPEG-coded data, the buffer bits may be erroneously processed, resulting in decoding errors.

It is therefore necessary in such cases to add an ID identifying where the last variable length coded data ends. In FIG. 22B, the code count NC is added. It is to be noted that any ID preventing erroneous decoding of the final buffer bits can be used in place of the code count. For example, a pointer to the first buffer bit, or an ID identifying the number of DCT blocks recorded, can be used to generate the high speed reproduction data synchronization blocks. In FIGS. 22A and 22B, RB indicates the space not occupied by data.

Figure 22C:
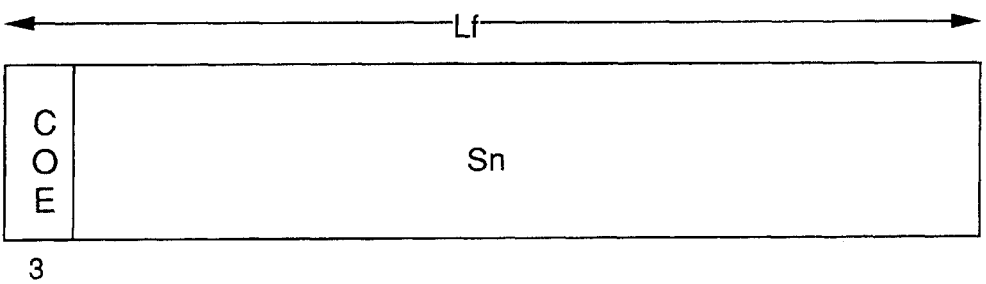
FIG. 22C is a map of the synchronization blocks wherein normal reproduction data Sn is stored.

Referring back to FIG. 19, The bit stream is also input directly to the SB generator 105, which generates the synchronization blocks for normal reproduction. The normal reproduction synchronization blocks also contain the header information contained in the input bit stream. The normal reproduction SB generator 105 segments the bit stream in units of a predetermined length, and adds a flag recorded with the data indicating that these segmented units are normal reproduction data. By thus recording this normal reproduction data flag, e.g., recording a '110' at the beginning of the synchronization block as shown in FIG. 22C, the normal reproduction data Sn can be distinguished from the high speed reproduction data Sh (because the high speed reproduction data synchronization blocks start with either a '000' or '001' code). The input bit stream Sb thus processed by the respective high speed reproduction SB generator 104 and the normal reproduction SB generator 105 is input to the formatter 106.

Figure 23:
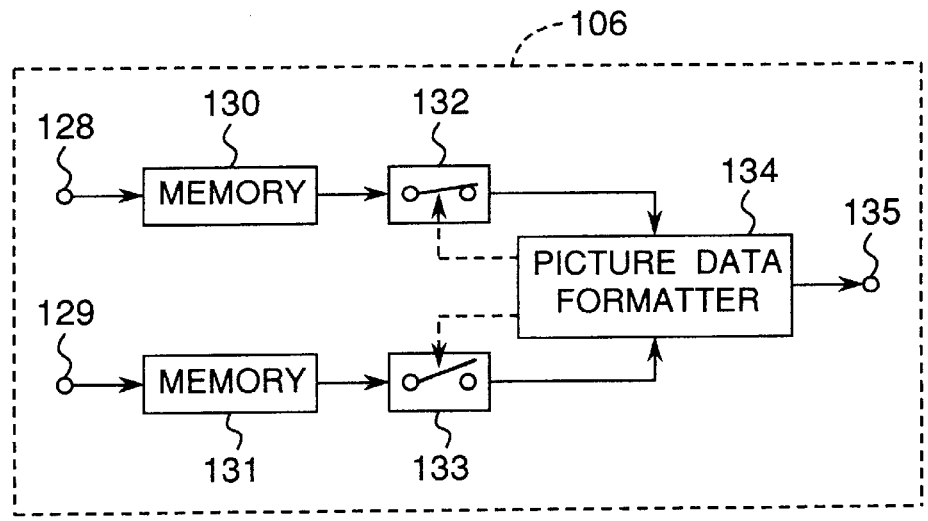
FIG. 23 is a block diagram showing the formatter in the recording and reproducing apparatus of FIG. 19.

Referring to FIG. 23, details of the formatter 106 is shown. The formatter 106 includes input terminals 128 and 129 for receiving the synchronization blocks from the SB generators 104 and 105, respectively, memories 130 and 131, control switches 132 and 133, a picture data formatter 134, and an output terminal 135 which are connected to each other, as shown in FIG. 23. The synchronization blocks are input to respective memory areas 130 and 131 through input terminals 128 and 129. The data is then read from the memories 130 and 131 in the appropriate sequence by the control switches 132 and 133 to input the data to the picture data formatter 134. The picture data formatter 134 formats the data for recording to the corresponding normal reproduction data and high speed reproduction data areas An and Ah of the recording tracks, and outputs the formatted bit stream from output terminal 135.

When recording the data, the formatting circuit 106 thus sequences the high speed reproduction synchronization blocks and the normal reproduction synchronization blocks according to a predetermined rule, thereby enabling the synchronization blocks to be recorded to the predetermined positions on the recording medium. In this embodiment, the high speed reproduction data Sh and the normal reproduction data Sn are respectively stored in memories 130 and 131, and switches 132 and 133 are controlled by the picture data formatter 134 so that the normal reproduction data Sn is recorded to the normal reproduction data area An of the recording track, and the high speed reproduction data Sh is recorded to the high speed reproduction area Ah of the recording track.

The formatted data is then error correction coded by the error correction encoder 107, the error corrected data is modulated by the recording modulation circuit 108 for recording, and the modulated data is then recorded by the recording head 109 to the tape-like recording medium 110.

Figure 24:
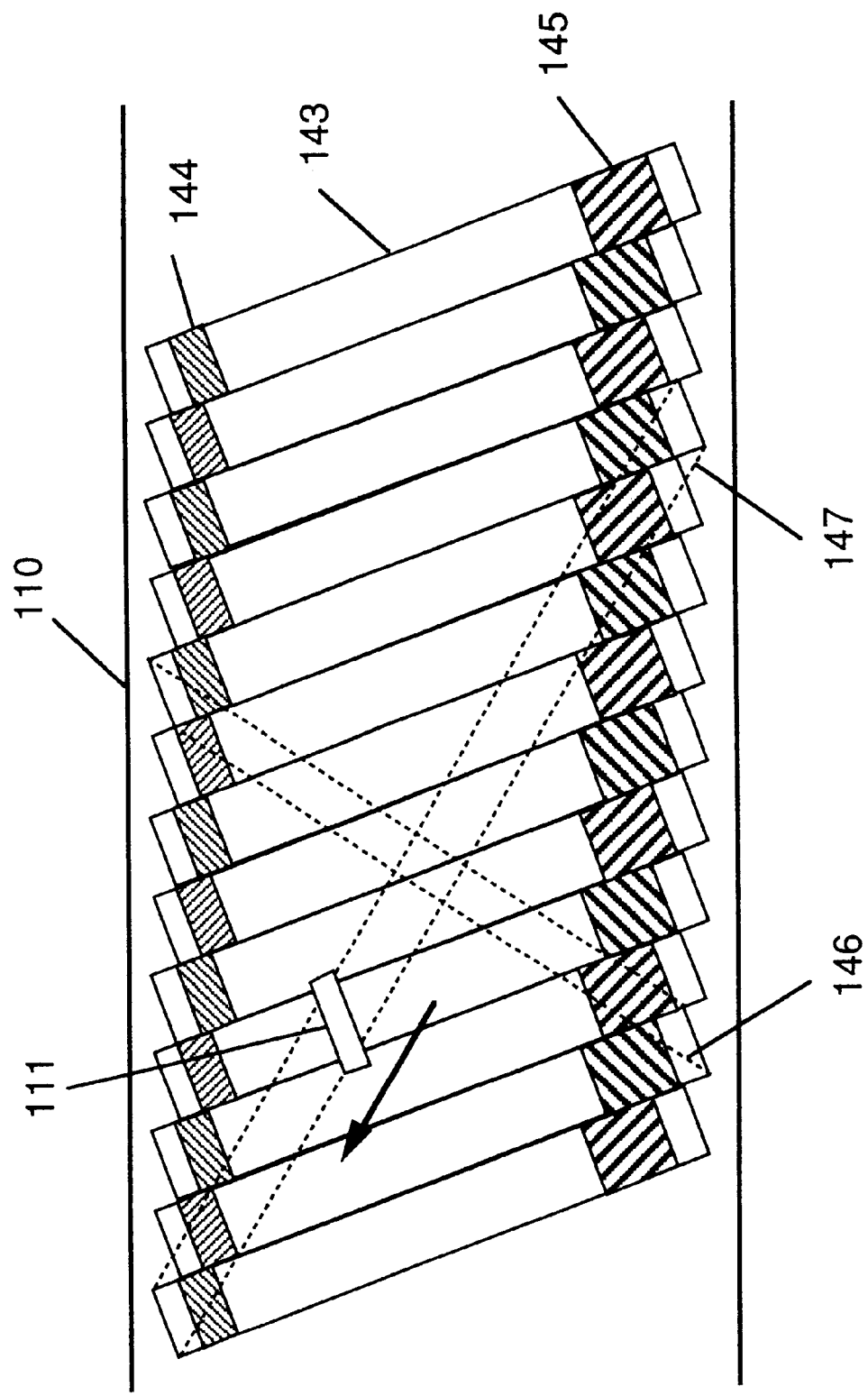
FIG. 24 is a map of the tape pattern recorded by the recording and reproducing apparatus of FIG. 19.

The recording pattern formed on the tape may be as shown in FIG. 24, but it should be noted that the very-high speed reproduction data area Av of the first through fourth recording patterns has been omitted for the sake of brevity. The recording pattern of the high speed reproduction data area also conforms to that described in the first through fourth recording patterns. For example, in FIG. 24, areas 144 and 145 are the high speed reproduction data areas Av, and area 143 is the normal reproduction data area An. The principle for reproducing the high speed reproduction data Sh is identical to that described with reference to the first through fourth recording patterns.

The method of processing the signal reproduced from the tape-like recording medium 110 above is described next.

The reproduction system Sw of the apparatus shown in FIG. 19 includes a reproduction head 111, a reproduction demodulator 112, an error corrector 113, a deformatter 114, a high speed reproduction data reproducer 115, a bit stream generator 117, a bit stream reproducer 116, a header copier 119, memory 118, a switch 120, and an output terminal 121 which are connected to each other, as shown in FIG. 19.

During normal reproduction, the reproduction head 111 (which may also function as the recording head 109 during recording) reads the signals from each of the recording tracks, and the signal modulation applied by the recording modulation circuit during recording is removed by the reproduction demodulation circuit 112; the demodulated signal is then input to the error correction circuit 113. Insofar as possible, the error correction circuit 113 corrects any errors resulting from the recording and reproducing process, and inputs the error corrected data to the deformatting circuit 114.

Figure 28:
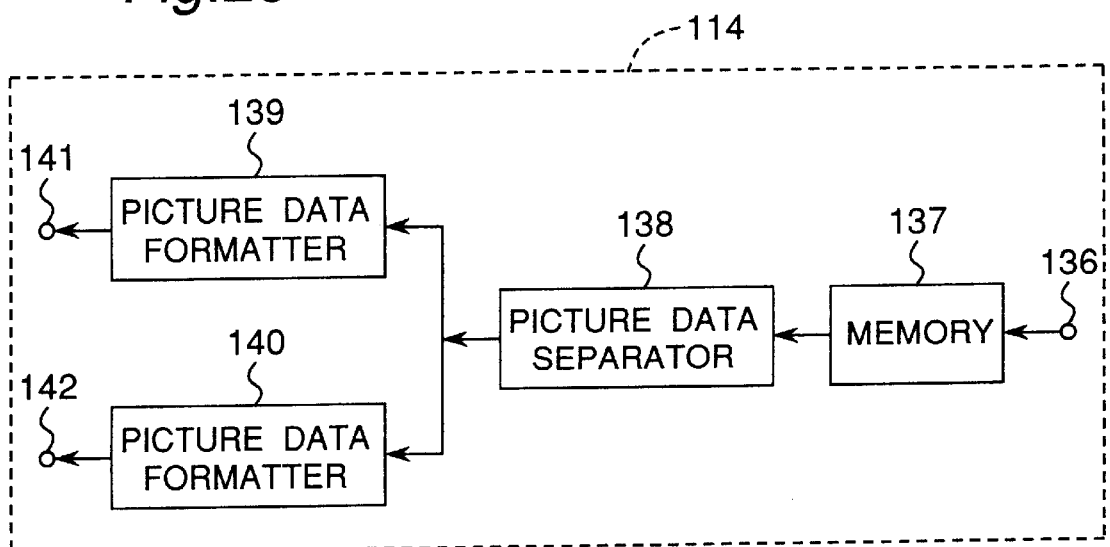
FIG. 28 is a block diagram showing the deformatter in the recording and reproducing apparatus of FIG. 19.

Referring to FIG. 28, details of the deformatter 114 is shown. The deformatter 114 includes an input terminal 136 memory 137; picture data separator 138; picture data formatters 139 and 140; and output terminals 141 and 142.

The signal input from the input terminal 136 is stored temporarily to the memory 137 from which the reproduced picture data is read by the picture data separator 138 at the appropriate timing to separate the original high speed reproduction data and the normal reproduction data by a process essentially reversing that used during recording. The separated data is then restored by the picture data formatters 139 and 140 to normal reproduction and high speed reproduction bit streams identical to those input to the formatter 106 during recording, and the reproduced bit streams Sb are separately output from the output terminals 141 and 142 to the high speed reproduction data reproducer 115 and bit stream reproducer 116, respectively. In other words, the normal reproduction data output from the terminal 141 of deformatting circuit 114 is input to the bit stream reproducer 116 and the high speed reproduction data reproducer 115.

The picture data input to the bit stream reproducer 116 is processed to reverse the formatting applied by the SB generator 105 during recording, and the resulting data is output as the reproduction bit stream to the header copier 119. The header copier 119 extracts the header information contained in the normal reproduction data bit stream during normal reproduction, and writes the extracted header information to the memory 118. The stored header information is used during high speed reproduction as the high speed reproduction header. The normal reproduction bit stream is then passed from the header copier 119 to the switch 120, which is controlled to output the normal reproduction bit stream during normal reproduction modes and the high speed reproduction bit stream during high speed reproduction modes.

The reproduction image can thus be obtained from the reproduced bit stream during normal reproduction, and the header information can be simultaneously written to memory 118.

During high speed reproduction, the high speed reproduction data Sh can be obtained by applying the same principle described with reference to the first through fourth recording patterns. The reproduced high speed reproduction data Sh is similarly input to the reproduction demodulator 112 and error corrector 113, and input to the deformatter 114. During high speed reproduction, the deformatter 114 extracts the high speed reproduction data Sh for input to the high speed reproduction data reproducer 115. The high speed reproduction data reproducer 115 recombines the AC and DC components separated by the SB generator 104 during recording to the original sequence, and outputs a bit stream without any header information. Note that the EOB codes removed during recording are added back into the bit stream.

The bit stream generator 117 joins the high speed reproduction data Sh input from the high speed reproduction data reproducer 115 with the header information stored to the memory 118 during normal reproduction, and thereby restores the data to the original, correct syntax.

The restored, correct syntax high speed reproduction bit stream is then output from the output terminal 121 when the switch 120 is reset to the high speed reproduction side.

Third embodiment

Figure 25:
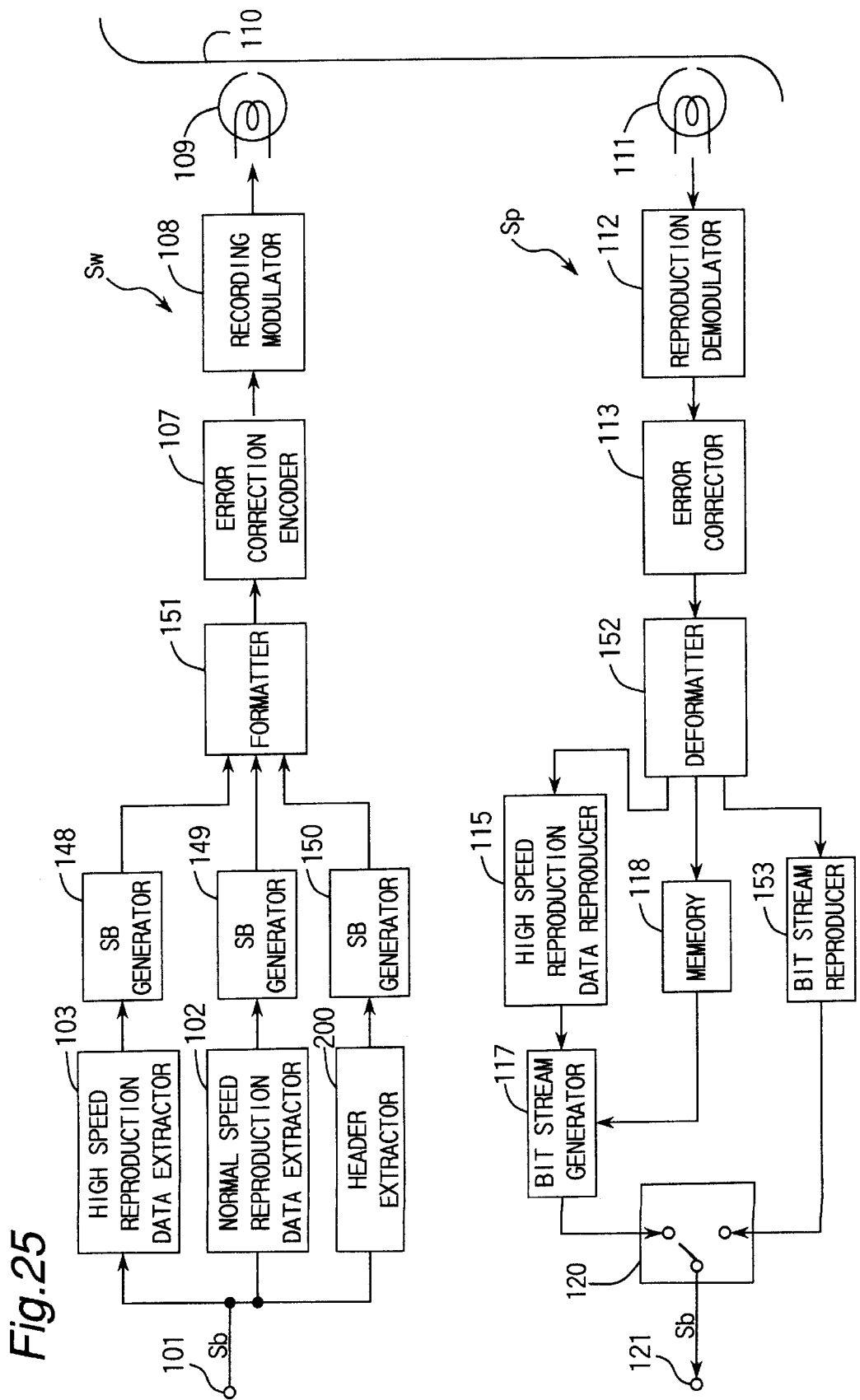
FIG. 25 is a block diagram showing a recording and reproducing apparatus according to a third embodiment of the present invention.

Referring to FIG. 25, an alternative of recording and reproducing apparatus of FIG. 19 is shown. This embodiment differs from the second embodiment in the method of recording the header information. In the second embodiment, the header information is recorded within the normal reproduction data; in this third embodiment, however, the header information is recorded with neither the normal reproduction data nor the high speed reproduction data, but is recorded to a separate area to which only the header information is recorded.

As shown in FIG. 25, the recording system Sw according to this embodiment further includes a normal speed reproduction data extractor 102, a header extractor 200, two SB generator 149 and 150 which are connected to each other. Note that a SB generator 148 is identical to the SB generator 104 of FIG. 19. The bit stream Sb is input through input terminal 101 to the high speed reproduction data extractor 103, the normal reproduction data extractor 102, and the header extractor 200; from there to the SB generators 148, 149, and 150, respectively; and from each of the SB generators to the formatting circuit 151, the error correction encoder 107, and the recording modulator 108 for processing and recording by the recording head 109 to the tape-like recording medium 110.

The high speed reproduction data Sh is generated by the high speed reproduction data extractor 103 and the corresponding SB generator 148 as described with reference to the second embodiment.

The normal reproduction data Sn is first input to the normal reproduction data extractor 102, which removes the header information and outputs the remaining normal reproduction data in the bit stream Sb. The SB generator 149 then segments the bit stream into fixed-length synchronization blocks, and adds an ID code, '100' in this embodiment, as shown in FIG. 22C.

Figure 22D:
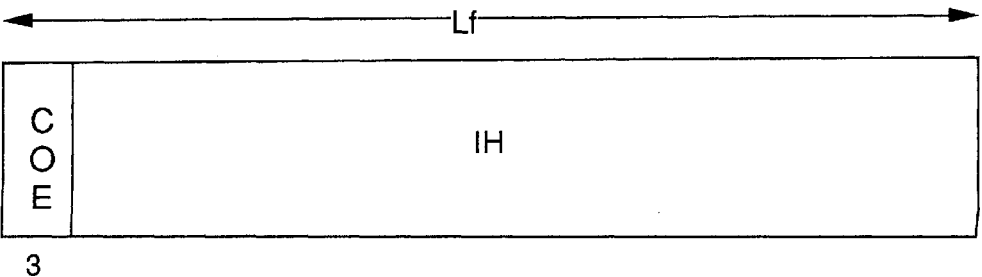
FIG. 22D is a map of the synchronization blocks wherein the header information is stored.

After the header information is extracted by the header extractor 200, the header information is input to the corresponding SB generator 150, which segments the header information into fixed-length synchronization blocks, and adds an ID code, '111' in this embodiment, to generate the header information synchronization blocks IH, as shown in FIG. 22D.

The high speed reproduction, normal reproduction, and header information synchronization blocks thus generated are separately input to the formatter 151, which sequences the synchronization blocks according to a predetermined rule, thereby enabling the synchronization blocks to be recorded according to the tape pattern, as shown in FIG. 24.

In the second embodiment, areas 144 and 145 are used as the high speed reproduction data areas Ah. In this third embodiment, however, area 144 is used for recording the header information exclusively, and area 145 for recording the high speed reproduction data Sh; area 143 is still used for the normal reproduction data Sn. The recording pattern of the high speed reproduction data area 145 is the same as that described with reference to the first through fifth recording tape patterns. If the header area 144 is likewise recorded repeatedly, a tape pattern whereby all header information can be reproduced using the same principle applied to reproduce the high speed reproduction data area can be achieved.

The data formatted for this tape pattern is processed by the error correction encoder 107 and recording modulator 108 as described above for recording to the tape-like recording medium 110 by the recording head 109.

Referring back to FIG. 25, the reproduction system Sp does not include the header copier 119 when compared with FIG. 19. Also the deformatter 115 and bit stream reproducer 116 are replaced by deformatter 152 and copier 153, respectively, and are connected to each other, as shown in FIG. 25. The data reproduced by the reproduction head 111 (which may also function as the recording head 109 during recording) is demodulated by the reproduction demodulator 112 to remove the modulation applied by the recording modulator during recording, then input to the error corrector 113 for error correction, and the error corrected signal is input to the deformatter 152. The deformatter 152 separates the reproduced bit stream Sb into the high speed reproduction synchronization blocks, the header information synchronization blocks, and the normal reproduction synchronization blocks.

Because all data is reproduced during normal reproduction, the normal reproduction data output from the deformatter 152 is input to the bit stream reproducer 153, which internally strips the ID code '100' at the beginning of the synchronization block and restores the original bit stream minus the header. The header of the header information synchronization block is input to the RAM memory 118; the ID code '111' is stripped from the header when the header information is read from the memory 118. The header information is thus input to the bit stream reproducer 153, which relinks the header information with the normal reproduction data. As a result, the normal reproduction data Sn is output with the appropriate header from the bit stream reproducer 153. This data is then passed by the switch 120 during normal reproduction for output from the output terminal 121 to complete normal reproduction.

High speed reproduction is achieved by applying the same process described with reference to the second embodiment. It is to be noted that the apparatus according to the second and third embodiments of the present invention have been described above such that the recording and reproducing apparatuses execute high speed reproduction and normal reproduction by way of example only, but the same method can also be applied in an apparatus capable of very-high speed reproduction as described with reference to the first through fourth recording patterns.

In this case, the very-high speed reproduction data Sv is recorded without a header, and during reproduction the very-high speed reproduction data Sv is relinked with the header information recorded with the normal reproduction data and reproduced during normal reproduction, or with the header information recorded to and reproduced from a separate header information recording area.

It is to be noted that in the above embodiments header information is also recorded in some form to the tape-like recording medium, but if the header information is static information that does not change over time or with the recorded data, the header information can be stored to a ROM or other non-volatile storage medium for use during reproduction.

It is to be noted that for normal reproduction the EOB code can be removed during recording and re-inserted during reproduction.

It will also be obvious that the signal recorded by any of the preceding embodiments shall not be limited to a video signal, and can be any type of digital signal. Furthermore, any means described above other than the heads, drums, and tapes may be constructed by software in a micro computer or circuits.

As apparent from the above, the recording apparatus according to the present invention for recording digital signals to plural tracks formed sequentially on a tape-like recording medium using plural heads disposed on a rotating drum is characterized by:

selecting the first through n (where n is 1 or greater) track sets, each track set comprising m (where m is 2 or greater) continuous tracks within the plural tracks formed on the tape-like recording medium;

disposing first through k (where k is 1 or greater) separated high speed reproduction data areas to the same positions in each of the m tracks comprising the first through n track sets; and recording the same high speed reproduction data to the same track position in at least the tracks having the same azimuth within the m*k high speed reproduction data areas belonging to the same track set; and selecting the n+1 through n+N (where N is 1 or greater) track sets, each track set comprising m (where m is 2 or greater) tracks selected from among the tracks to which the high speed reproduction data areas are not disposed;

disposing a continuous very-high speed reproduction data area to the same position in each of the M tracks comprising the n+1 through n+N track sets; and recording the same very-high speed reproduction data to the M very-high speed reproduction data areas belonging to the same track set within the M*N very-high speed reproduction data areas belonging to the n+1 to n+N track sets.

Preferably, the signal recording apparatus is characterized by repeatedly recording the same data to the very-high speed reproduction data area using as the recording unit a tape length less than or equal to reference length L, which is the length of data that can be captured when the reproduction head crosses one track with the tape travelling at very-high speed reproduction rate V.

The recording apparatus also preferably records digital signals by means of A or more heads of A (where A is 2 or greater) azimuth angles, and is characterized by each track set of selected M (where M is 2 or greater) tracks including two or more same-azimuth angle tracks selected from among the total A azimuth angles.

The recording apparatus is further preferably characterized by at least the tracks of A different azimuth angles being adjacent tracks within the M tracks.

The reproduction apparatus according to the present invention preferably comprises a high speed reproduction mode and/or a very-high speed reproduction mode, and is characterized by reproducing, by means of plurals heads disposed to a rotating drum, the high speed reproduction data and/or the very-high speed reproduction data from a tape-like recording medium recorded by any of the signal recording apparatuses described above.

The reproduction apparatus is further preferably characterized by controlling the tape speed of the tape-like recording medium to a constant speed during high or very-high speed reproduction.

The reproduction apparatus is further preferably characterized by controlling the tape-like recording medium by controlling the rotational velocity of the take-up reel and/or the supply reel of the tape-like recording medium during very-high speed reproduction.

The recording apparatus and/or a signal reproduction apparatus according to the present invention is further preferably characterized by the recorded or reproduced signal containing video data, and the high speed reproduction data or very-high speed reproduction data containing at least a signal calculated from the data within one frame (or one field) of the video.

For recording compressed digital signals input thereto to plural tracks formed sequentially on a tape-like recording medium using plural heads disposed on a rotating drum, the recording apparatus the apparatus records the compressed digital signal as normal reproduction data to a first specific area on the tape-like recording medium; extracts from the compressed digital data the high speed reproduction data and/or very-high speed reproduction data not containing header information; and records to a second specific area on the tape-like recording medium the extracted high speed reproduction data and/or very-high speed reproduction data not containing header information.

For reproducing data from a tape-like recording medium to which compressed digital data containing header information for normal reproduction is recorded to a first specific area, and high speed reproduction data and/or very-high speed reproduction data not containing header information is recorded to a second specific area, the reproduction apparatus separates the header information from the compressed digital data for normal reproduction containing header information reproduced from the first specific area; temporarily stores the separated header information; and adds the stored header information to the data reproduced during high speed reproduction or very-high speed reproduction.

For recording compressed digital signals input thereto to plural tracks formed sequentially on a tape-like recording medium using plural heads disposed on a rotating drum, the recording apparatus separates the compressed digital signal into the header information data and the normal reproduction data not including the header information; extracts from the compressed digital signal the high speed reproduction data and/or very-high speed reproduction data not containing header information; records the separated normal reproduction data to a first specific area on the tape-like recording medium; records to a second specific area on the tape-like recording medium the high speed reproduction data and/or very-high speed reproduction data not containing header information; and records to a third specific area on the tape-like recording medium the separated header information data.

For reproducing data from a tape-like recording medium to which normal reproduction data not containing header information is recorded to a first specific area, high speed reproduction data and/or very-high speed reproduction data not containing header information is recorded to a second specific area, and header information data is recorded to a third specific area, the reproduction apparatus adds to the normal reproduction data reproduced from the first specific area during normal reproduction the header information reproduced from the third specific area; and/or adds to the high speed reproduction data or very-high speed reproduction data reproduced from the second specific area during high speed reproduction the header information reproduced from the third specific area.

For recording compressed digital signals input thereto to plural tracks formed sequentially on a tape-like recording medium using plural heads disposed on a rotating drum, the signal recording apparatus extracts from the compressed digital signal the normal reproduction data not including the header information; records the extracted normal reproduction data not including the header information to a first specific area on the tape-like recording medium; extracts from the compressed digital signal the high speed reproduction data and/or very-high speed reproduction data not containing header information; and records to a second specific area on the tape-like recording medium the high speed reproduction data and/or very-high speed reproduction data not containing header information.

For reproducing data from a tape-like recording medium to which normal reproduction data not containing header information is recorded to a first specific area, and high speed reproduction data and/or very-high speed reproduction data not containing header information is recorded to a second specific area, the signal reproduction apparatus separates a header information from original data; and adds to the normal reproduction data reproduced from the first specific area during normal reproduction the header information generated by the header generator; and/or adds to the high speed reproduction data or very-high speed reproduction data reproduced from the second specific area during high speed reproduction the header information generated by the header generator.

The recording apparatus is further preferably characterized by the high speed reproduction data and/or very-high speed reproduction data not containing all or part of the codes (end-of-block, EOB) identifying the end of the data block.

The reproducing apparatus is further preferably characterized by the high speed reproduction data and/or very-high speed reproduction data not containing all or part of the codes (end-of-block, EOB) identifying the end of the data block.

The recording and reproducing apparatus according to the present invention is characterized by the signal recording apparatus thereof comprising any one of the recording apparatuses described above, and the signal reproduction apparatus thereof comprising any one of the signal recording apparatuses and signal reproduction apparatuses described above.

The recording and reproducing apparatus is characterized by the signal recording section thereof comprising any one of the signal recording apparatuses described above, and the signal reproduction section thereof comprising a signal reproduction means corresponding to the signal recording section as described above.

By means of the embodiments described above, the recording and reproducing apparatus can greatly increase the range of tape speeds usable during very-high speed reproduction. In addition, the band width and number of areas to which the high speed reproduction data is recorded can be set freely without affecting the very-high speed reproduction data area, and the data rate during high speed reproduction can be greatly improved. Furthermore, because the data rate for high speed reproduction can be improved, high image quality high speed reproduction and high speed reproduction with a short image refresh cycle can be achieved.

In addition, because the present invention limits recording redundant data components such as header information and EOB codes as much as possible, it is possible to increase the amount of actual video information recorded at any given data rate, thereby enabling high image quality reproduction and reproduction with a short image refresh cycle.

Thus, the recording apparatus according to the present invention enables high speed reproduction and very-high speed reproduction by disposing the high speed reproduction data and the very-high speed reproduction data without reducing the amount of high speed reproduction data recorded or the speed range for very-high speed reproduction, and thereby achieving a good image refresh cycle and good speed range.

Furthermore, a good image refresh cycle and good speed range by reducing the non-picture data recorded in the high speed reproduction data or very-high speed reproduction data, thereby assuring an effective amount of video information is recorded, can be achieved.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A recording apparatus for recording signals to plural tracks formed sequentially on a tape-like recording medium using plural recording heads disposed on a rotating drum, said apparatus comprising:

a first selecting means for selecting the first through n track sets, each track set comprising m continuous tracks within the plural tracks formed on said tape-like recording medium, said n being 1 or greater, said m being 2 or greater;

a disposing means for disposing the first through k separated high speed reproduction data areas to the same positions in each of the m tracks comprising the first through n track sets, said k being 1 or greater;

a first recording means for recording the same high speed reproduction data to the same track position in at least the tracks having the same azimuth angle within the m*k high speed reproduction data areas belonging to the same track set;

a second selecting means for selecting n+1 through n+N track sets, each track set comprising M tracks selected from among the tracks to which the high speed reproduction data areas are not disposed, said N being 1 or greater, said M being 2 or greater;

a second disposing means for disposing a continuous very-high speed reproduction data area to the same position in each of the M tracks forming the n+1 through n+N track sets; and a second recording means for recording the same very-high speed reproduction data to the M very-high speed reproduction data areas belonging to the same track set within the M*N very-high speed reproduction data areas belonging to the n+1 to n+N track sets.

2. A recording apparatus as claimed in claim 1, further comprising a third recording means for repeatedly recording the same data to the very-high speed reproduction data area using as the recording unit a tape length less than or equal to a reference length, said reference length being the length of data that can be captured when a reproduction head crosses one track with the tape travelling at a very-high speed reproduction rate.

3. A recording apparatus as claimed in claim 2, wherein said signals are recorded by said recording heads of A azimuth angles, each of said track sets of selected M tracks including two tracks of the same azimuth angle for each of the A azimuth angles.

4. A recording apparatus as claimed in claim 3, wherein different tracks of A azimuth angles being adjacent tracks within the M tracks.

5. A recording apparatus as claimed in claim 1, further comprising a reproducing apparatus, said reproducing apparatus comprising either one of a high speed reproduction mode and a very-high speed reproduction mode, and characterized by reproducing, by means of plurals heads provided a rotating drum being disposed to said tape-like recording medium, the high speed reproduction data and the very-high speed reproduction data, respectively, from said tape-like recording medium.

6. A recording apparatus as claimed in claim 5, wherein either one of said high speed reproduction data and said very-high speed reproduction data has the codes identifying the end of the data block having been at least partially removed therefrom.

7. A recording apparatus as claimed in claim 1, wherein said recorded signals contain video data; and either one of said high speed reproduction data and said very-high speed reproduction data contains at least a signal calculated from the data within any of one frame or one field of the video data.

8. A recording and reproducing apparatus comprising:

a plurality of heads provided in a rotating drum being disposed to a tape-like recording medium, reproducing means for reproducing in a normal speed reproduction mode, a high speed reproduction mode and a very high speed reproduction mode normal speed reproduction data, high speed reproduction data and very-high speed reproduction data, respectively, from respective discrete areas of said tape-like recording medium; and a reproduction controller for controlling rotation of said drum and feeding speed of said tape-like recording medium so that:

a) during said normal speed reproduction mode, said feeding speed of said tape-like recording medium, rotating speed of said drum, and rotating phase of said drum are synchronized to each other;

b) during said high speed reproduction mode, said feeding speed of said tape-like recording medium, and said rotating speed of said drum are synchronized to each other; and c) during said very-high speed reproduction mode, said feeding speed of said tape-like recording medium is continuously variable within a range of reproduction speeds.

9. A reproducing apparatus as claimed in claim 8, said tape-like recording medium being controlled with respect to the rotational velocity of any of the take-up reel and the supply reel during very-high speed reproduction so that said feeding speed of said tape-like recording medium is continuously variable.

10. A recording and reproducing apparatus according to claim 8, wherein:

a) said plurality of heads define a head path on said recording medium as said plurality of heads and said recording medium move;

b) a plurality of tracks are defined on said recording medium; and c) said reproducing means reproduces said high speed reproduction data without fixing the phase relationship between the tracks and head path at any even multiple of a normal reproduction speed of said recording medium.

11. A recording and reproducing apparatus according to claim 8, wherein:

a) said plurality of heads define a head path on said recording medium as said plurality of heads and said recording medium move;

b) a plurality of tracks are defined on said recording medium; and c) said reproducing means reproduces said very high speed reproduction data irrespective of the phase relationship between the head path and the tracks.

12. A recording and reproducing apparatus according to claim 8, wherein a plurality of tracks which each include a track portion and a further track portion are formed on said recording medium, further comprising means for:

a) recording said high speed reproduction data in said track portion of ones of said plurality of tracks; and b) recording said very high speed reproduction data in both said track portion and said further track portion of others of said plurality of tracks.

13. A recording and reproducing apparatus according to claim 8, wherein for said very high speed reproduction mode, a tape feeding speed data area is provided in a speed range of positive and negative reproduction speeds and wherein the reproduction speed is continuously variable for a single stream of said very-high speed reproduction data.

* * * * *